(12) United States Patent
Guler et al.

(10) Patent No.: US 12,394,154 B2
(45) Date of Patent: Aug. 19, 2025

(54) BODY MESH RECONSTRUCTION FROM RGB IMAGE

(71) Applicant: Snap Inc., Santa Monica, CA (US)

(72) Inventors: Riza Alp Guler, London (GB); Frank Lu, London (GB); Georgios Papandreou, London (GB); Haoyang Wang, London (GB)

(73) Assignee: SNAP INC., Santa Monica, CA (US)

( * ) Notice: Subject to any disclaimer, the term of this patent is extended or adjusted under 35 U.S.C. 154(b) by 244 days.

(21) Appl. No.: 18/339,780

(22) Filed: Jun. 22, 2023

(65) Prior Publication Data

US 2024/0346763 A1    Oct. 17, 2024

(30) Foreign Application Priority Data

Apr. 13, 2023 (GR) .............................. 20230100328

(51) Int. Cl.
*G06T 17/20* (2006.01)
*G06T 7/73* (2017.01)
(Continued)

(52) U.S. Cl.
CPC .............. *G06T 17/20* (2013.01); *G06T 7/73* (2017.01); *G06T 13/40* (2013.01); *G06T 19/006* (2013.01);
(Continued)

(58) Field of Classification Search
None
See application file for complete search history.

(56) References Cited

U.S. PATENT DOCUMENTS 5,604,843 A     2/1997   Shaw et al.
5,689,559 A    11/1997   Park
                (Continued)

FOREIGN PATENT DOCUMENTS

CN    109863532 A    6/2019
CN    110168478 A    8/2019
                (Continued)

OTHER PUBLICATIONS

"U.S. Appl. No. 18/134,347, Non Final Office Action mailed Mar. 6, 2025", 16 pgs.
(Continued)

*Primary Examiner* — Tapas Mazumder
(74) *Attorney, Agent, or Firm* — SCHWEGMAN LUNDBERG & WOESSNER, P.A.

(57) ABSTRACT

Methods and systems are disclosed for generating a body mesh from a single image. The system predicts both a volumetric reconstruction tensor of the monocular image and a pose of an object by applying a first machine learning model to a monocular image. The system identifies a portion of the pose of the object that corresponds to a point in a canonical space associated with a set of position encoding information. The system obtains a point of the volumetric reconstruction tensor corresponding to the identified portion of the pose. The system classifies the obtained point as being inside or outside of a canonical volume by applying a second machine learning model to the obtained point of the volumetric reconstruction tensor together with the set of position encoding information. The system generates a three-dimensional (3D) mesh representing the object in the canonical space.

20 Claims, 13 Drawing Sheets

(51) Int. Cl.
  *G06T 13/40*    (2011.01)
  *G06T 19/00*    (2011.01)
(52) U.S. Cl.
  CPC ............. *G06T 2207/20081* (2013.01); *G06T 2207/20132* (2013.01); *G06T 2207/30201* (2013.01)

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernÁNdez et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-HernÁNdez et al. |
| 11,284,144 B2 | 3/2022 | Kotsopoulos et al. |
| 11,361,507 B1 * | 6/2022 | Iqbal .................. G06T 19/20 |
| 11,893,675 B1 | 2/2024 | Bhushan et al. |

(56) References Cited

U.S. PATENT DOCUMENTS

| | | |
|---|---|---|
| 12,136,180 B1 | 11/2024 | Karumuri et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0197331 A1 | 7/2018 | Chen et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0280997 A1 | 9/2019 | Baldwin et al. |
| 2020/0306637 A1 | 10/2020 | Baldwin et al. |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0385180 A1 | 12/2021 | Al Majid et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2022/0063605 A1* | 3/2022 | Ji ................. G06F 18/2193 |
| 2022/0335647 A1* | 10/2022 | Shrivastava ........... G06V 10/82 |
| 2023/0088866 A1 | 3/2023 | Stuyck et al. |
| 2023/0245192 A1* | 8/2023 | Zaki .................. G06Q 30/0643 |
| | | 705/26.5 |
| 2024/0029358 A1 | 1/2024 | Sharma et al. |
| 2024/0242435 A1 | 7/2024 | Wang et al. |
| 2024/0346762 A1 | 10/2024 | Dudovitch et al. |

FOREIGN PATENT DOCUMENTS

| | | | |
|---|---|---|---|
| EP | 2184092 | A2 | 5/2010 |
| JP | 2001230801 | A | 8/2001 |
| JP | 5497931 | B2 | 3/2014 |
| KR | 101445263 | B1 | 9/2014 |
| WO | WO-2003094072 | A1 | 11/2003 |
| WO | WO-2004095308 | A1 | 11/2004 |
| WO | WO-2006107182 | A1 | 10/2006 |
| WO | WO-2007134402 | A1 | 11/2007 |
| WO | WO-2012139276 | A1 | 10/2012 |
| WO | WO-2013027893 | A1 | 2/2013 |
| WO | WO-2013152454 | A1 | 10/2013 |
| WO | WO-2013166588 | A1 | 11/2013 |
| WO | WO-2014031899 | A1 | 2/2014 |
| WO | WO-2014194439 | A1 | 12/2014 |
| WO | WO-2016090605 | A1 | 6/2016 |
| WO | WO-2018081013 | A1 | 5/2018 |
| WO | WO-2018102562 | A1 | 6/2018 |
| WO | WO-2018129531 | A1 | 7/2018 |
| WO | WO-2019089613 | A1 | 5/2019 |
| WO | WO-2024215560 | A1 | 10/2024 |
| WO | WO-2024215717 | A1 | 10/2024 |

OTHER PUBLICATIONS

"International Application Serial No. PCT/US2024/023095, International Search Report mailed Jul. 9, 2024", 2 pgs.

"International Application Serial No. PCT/US2024/023095, Written Opinion mailed Jul. 9, 2024", 3 pgs.

"International Application Serial No. PCT/US2024/023817, International Search Report mailed Jul. 31, 2024", 3 pgs.

"International Application Serial No. PCT/US2024/023817, Written Opinion mailed Jul. 31, 2024", 8 pgs.

Anpet, Chen, et al., "TensoRF: Tensorial Radiance Fields", arxiv.org, Cornell University Library, 201 Olin Library Cornell University Ithaca, NY 14853, (Nov. 29, 2022), 33 pgs.

Bhatnagar, Bharat, et al., "Multi-Garment Net: Learning to Dress 3D People From Images", IEEE/CVF International Conference on Computer Vision (ICCV), IEEE, (Oct. 27, 2019), 11 pgs.

Loper, Matthew, et al., "SMPL: A Skinned Multi-Person Linear Model", ACM Transactions on Graphics, vol. 34, No. 6, Article 248, [Online]. Retrieved from the Internet: <https://doi.org/10.1145/2816795.2818013>, (Nov. 2015), 16 pages.

Moon, Gyeongsik, et al., "3D Clothed Human Reconstruction in the Wild", In: "17th European Conference on Computer Vision, ECCV, Lecture Notes in Computer Science (13662)", Springer, Berlin, Germany, [Online] Retrieved from the internet: <https://link.springer.com/content/pdf/10.1007/978-3-031-20086-1_11.pdf?pdf=inline%201ink>, (Nov. 11, 2022).

Wojciech, Zielonka, et al., "Instant Volumetric Head Avatars", arxiv.org, Cornell University Library, 201 Olin Library Cornell University Ithaca, NY 14853, (Mar. 23, 2023), 17 pgs.

(56) References Cited

OTHER PUBLICATIONS

U.S. Appl. No. 18/134,347, filed Apr. 13, 2023, Animatable Garment Extraction Through Volumetric Reconstruction.
"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.
"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.
"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.
"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.
"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.
"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.
"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.
Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

\* cited by examiner

BODY MESH RECONSTRUCTION FROM RGB IMAGE

CLAIM OF PRIORITY

This application claims the benefit of priority to Greece patent application Ser. No. 20230100328, filed on Apr. 13, 2023, which is incorporated herein by reference in its entirety.

TECHNICAL FIELD

The present disclosure relates to extended reality (XR) devices, such as augmented reality (AR) and/or virtual reality (VR) devices.

BACKGROUND

AR is a modification of a virtual environment. For example, in VR, a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
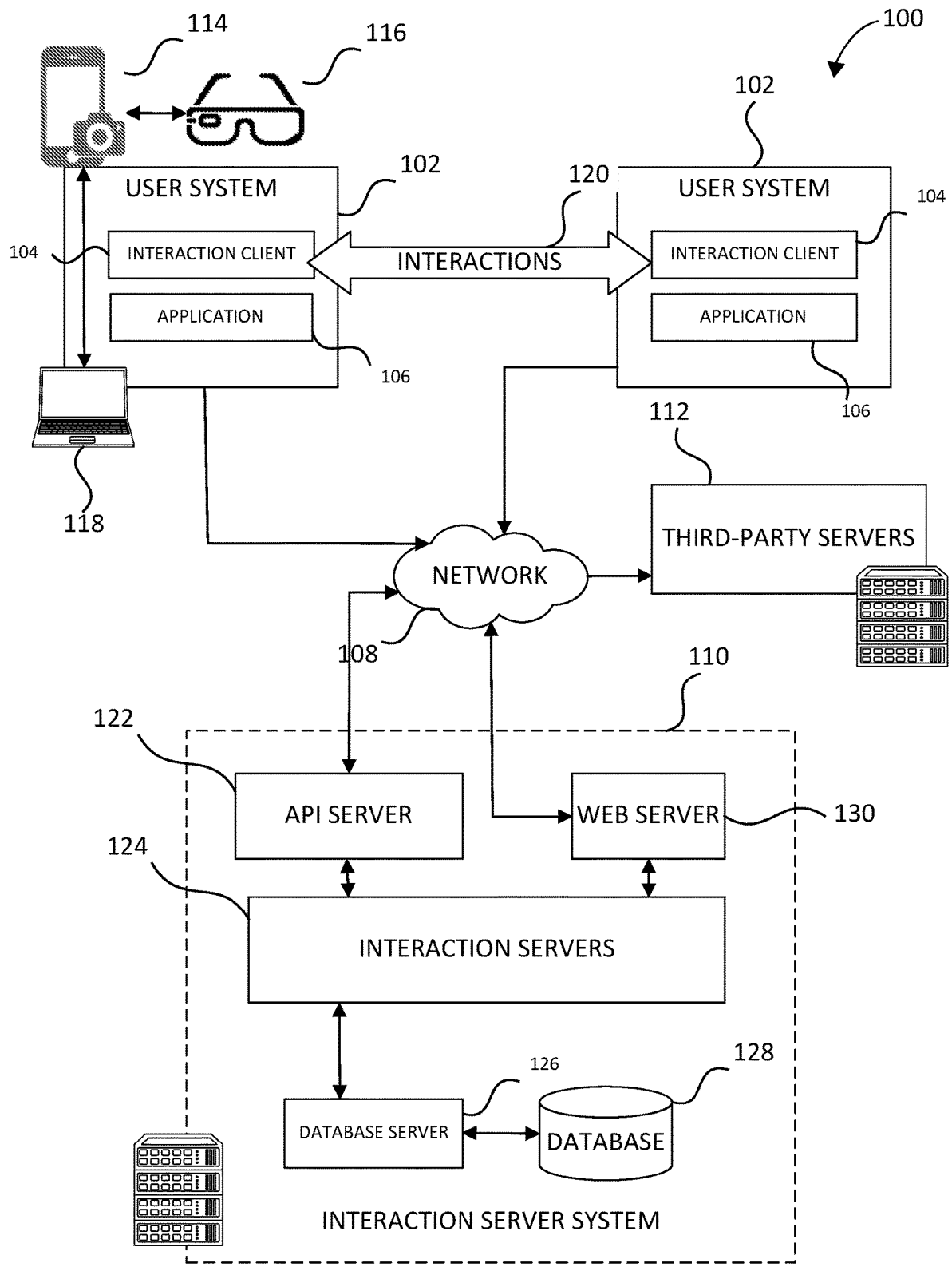
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, VR and AR systems display images representing a given user by capturing an image of the user and, in addition, obtaining a depth map using a depth sensor of the real-world human body depicted in the image. By processing the depth map and the image together, the VR and AR systems can detect positioning of the user in the image and can appropriately modify the user or background in the images. While such systems work well, the need for a depth sensor limits the scope of their applications. This is because adding depth sensors to user devices for the purpose of modifying images increases the overall cost and complexity of the devices, making them less attractive and more difficult to implement in a mobile device setting.

Certain systems estimate three-dimensional (3D) meshes of persons depicted in images to provide AR/VR experiences. Human 3D pose understanding is essential to human-computer interaction, motion capture, action recognition, and augmented and virtual reality (AR/VR). Human mesh reconstruction has received increased attention recently based on the premise that information beyond the 3D skeleton can unlock new experiences that require detailed estimation of 3D human geometry, such as avatar construction and telepresence for VR or visual effects and virtual try-on for AR.

Despite the rapid progress in 3D mesh reconstruction technology, the meshes resulting from current systems are still far from being pixel-accurate when projected back to the image domain. Some conventional systems predict the 3D mesh through a parametric human model using an already cropped image. A convolutional encoder is used to minimize the 2D joints' reprojection error, while a discriminator decides if the 3D parameters are plausible. Such systems are incredibly complex to implement, such as on mobile device platforms, and will still produce results that are not pixel-accurate. Certain conventional systems generate a 3D mesh by predicting the full body 3D reconstruction of an object depicted in an image using multiple networks that are each trained independent of one another. For example, the conventional systems can use a first machine learning model to generate a pose of an object depicted in an image, a second machine learning model to generate a pixel representation of the object depicted in the image, and yet a third machine learning model to determine whether pixels of the object correspond to a canonical space volume representing the object. Because three individual machine learning models are used in these conventional systems to generate independent predictions, results can include multiple instances of disagreement, poor training, and lack of efficiency when deployed on user devices, such as mobile platforms. Even still, these systems fail to provide pixel-accurate representations of both the entire body of the users and facial aspects of the users and usually produce many blurry portions of the meshes specifically in facial regions.

The disclosed techniques seek to improve the way in which a 3D mesh is generated for one or more real-world objects (e.g., real-world persons) depicted in an image or video. The disclosed techniques predict both a volumetric reconstruction tensor of the monocular image and a pose of an object by applying a first machine learning model to a monocular image that depicts the object. The disclosed techniques identify a portion of the pose of the object that corresponds to a point in a canonical space associated with a set of position encoding information. The disclosed techniques obtain a point of the volumetric reconstruction tensor corresponding to the identified portion of the pose. The disclosed techniques classify the obtained point as being inside or outside of a canonical volume by applying a second machine learning model to the obtained point of the volumetric reconstruction tensor together with the set of position encoding information. The disclosed techniques generate a 3D mesh representing the object in the canonical space.

In addition, the disclosed techniques apply a similar process to generate a pixel-accurate facial mesh of the object depicted in the image. Particularly, the disclosed techniques crop a portion of the monocular image corresponding to a head of the object and predict a head-specific canonical space reconstruction of the object by applying a head-specific canonical network to the cropped portion based on generated facial landmarks of the object. The disclosed techniques then combine the head-specific canonical space reconstruction with the canonical volume corresponding to the object to generate a pixel-accurate canonical volume reconstruction of the object. In some cases, the disclosed techniques smoothly deform a region of overlap between a full body canonical space reconstruction of the object and the head-specific canonical space reconstruction to generate the pixel-accurate canonical volume reconstruction. This pixel-accurate canonical volume reconstruction can be used to generate and provide a bottom-up estimate of 3D mesh geometry that can be projected back to the image in a pixel-accurate manner.

This simplifies the process of adding AR graphics to an image or video, which significantly reduces design constraints and costs in generating such AR graphics and decreases the amount of processing complexities and power and memory requirements. This also improves the illusion of the AR graphics being part of a real-world environment depicted in an image or video that depicts real-world objects. This enables seamless and efficient addition of AR graphics to an underlying image or video in real time on small-scale mobile devices. The disclosed techniques can be applied exclusively or mostly on a mobile device without the need for the mobile device to send images/videos to a server. In other examples, the disclosed techniques are applied exclusively or mostly on a remote server or can be divided between a mobile device and a server.

This improves the overall experience of the user in using the electronic device. Also, by providing such AR experiences without using a depth sensor, the overall amount of system resources needed to accomplish a task is reduced. As used herein, "article of clothing," "fashion item," and "garment" are used interchangeably and should be understood to have the same meaning. Article of clothing, garment, or fashion item can include a shirt, skirt, dress, shoes, purse, furniture item, household item, eyewear, eyeglasses, AR logo, AR emblem, pants, shorts, jacket, t-shirt, blouse, glasses, jewelry, earrings, bunny ears, a hat, earmuffs, or any other suitable item or object.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106, and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
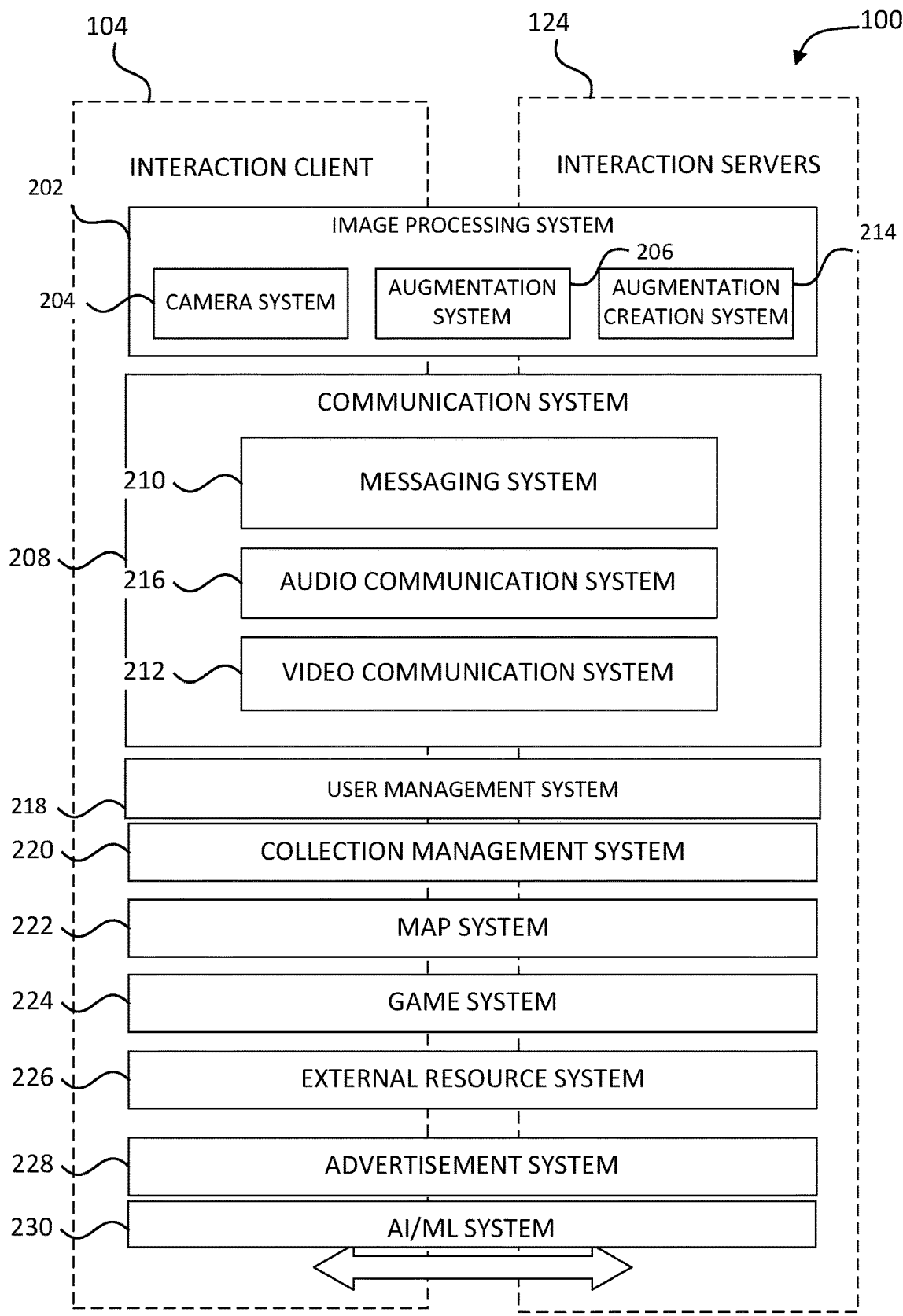
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below and can include a mesh generation system 500 that generates a mesh of an object depicted in a two-dimensional (2D) image, such as a user, to enable a user to control an interaction client/application/XR experience. An illustrative implementation of the mesh generation system 500 is shown and described in connection with FIG. 5 below.

In some examples, these subsystems are implemented as microservices. A microservice subsystem (e.g., a microservice application) may have components that enable it to operate independently and communicate with other services. Example components of a microservice subsystem may include:

- Function logic: The function logic implements the functionality of the microservice subsystem, representing a specific capability or function that the microservice provides.
- API interface: Microservices may communicate with other components through well-defined APIs or interfaces, using lightweight protocols such as REST or messaging. The API interface defines the inputs and outputs of the microservice subsystem and how it interacts with other microservice subsystems of the interaction system 100.
- Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.
- Service discovery: Microservice subsystems may find and communicate with other microservice subsystems of the interaction system 100. Service discovery mechanisms enable microservice subsystems to locate and communicate with other microservice subsystems in a scalable and efficient way.
- Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

An augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1302 (shown in FIG. 13) of a user system 102. These augmentations are selected by the augmentation system 206 and presented to a user of an interaction client 104, based on a number of inputs and data, such as, for example:

- Geolocation of the user system 102; and
- Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of a communication system 208, such as a messaging system 210 and a video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

An augmentation creation system 214 supports AR developer platforms and includes an application for content creators (e.g., artists and developers) to create and publish augmentations (e.g., AR experiences) of the interaction client 104. The augmentation creation system 214 provides a library of built-in features and tools to content creators including, for example, custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within a user management system 218) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310, and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., to delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302 of FIG. 3) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a graphical user interface (GUI) of the interaction client 104 to access features of the web-based external resource, the interaction client 104 obtains the HTML5 file and instantiates the resources to access the features of the web-based external resource.

The interaction client 104 presents a GUI (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another GUI of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., 2D avatars of users with or without different avatar characteristics). As another example, external resources that include small-scale versions of applications (e.g., web-based versions of applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content, XR experiences, and AR experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands. In some cases, the artificial intelligence and machine learning system 230 can implement one or more machine learning models that generate a 3D mesh of an object depicted in a 2D image using a combination of a head-specific canonical reconstruction network and/or a body canonical reconstruction network.

Data Architecture

Figure 3:
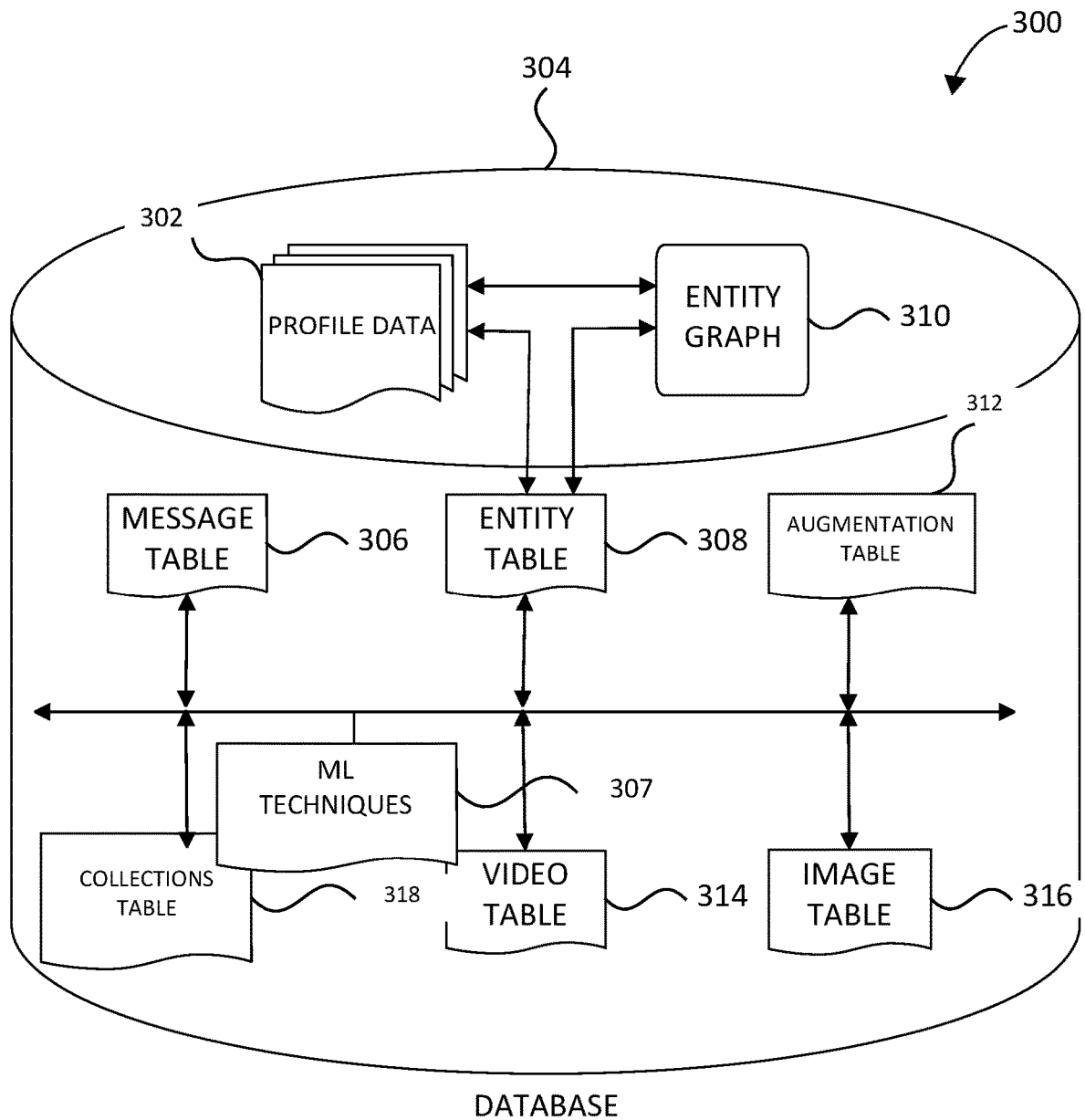
FIG. 3 is a diagrammatic representation of a data structure as maintained in a database, according to some examples.

FIG. 3 is a schematic diagram illustrating data structures 300, which may be stored in a database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 4.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100 or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a username, telephone number, address, settings (e.g., notification and privacy settings), and a user-selected avatar representation (or collection of such avatar representations). A particular user may then selectively include one or more of these avatar representations within the content of messages communicated via the interaction system 100 and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes AR content items (e.g., corresponding to applying "lenses" or AR experiences). An AR content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include trained machine learning techniques 307 that stores parameters of one or more machine learning models that have been trained during training of the mesh generation system 500. For example, trained machine learning techniques 307 stores the trained parameters of one or more artificial neural network machine learning models or techniques.

Data Communications Architecture

Figure 4:
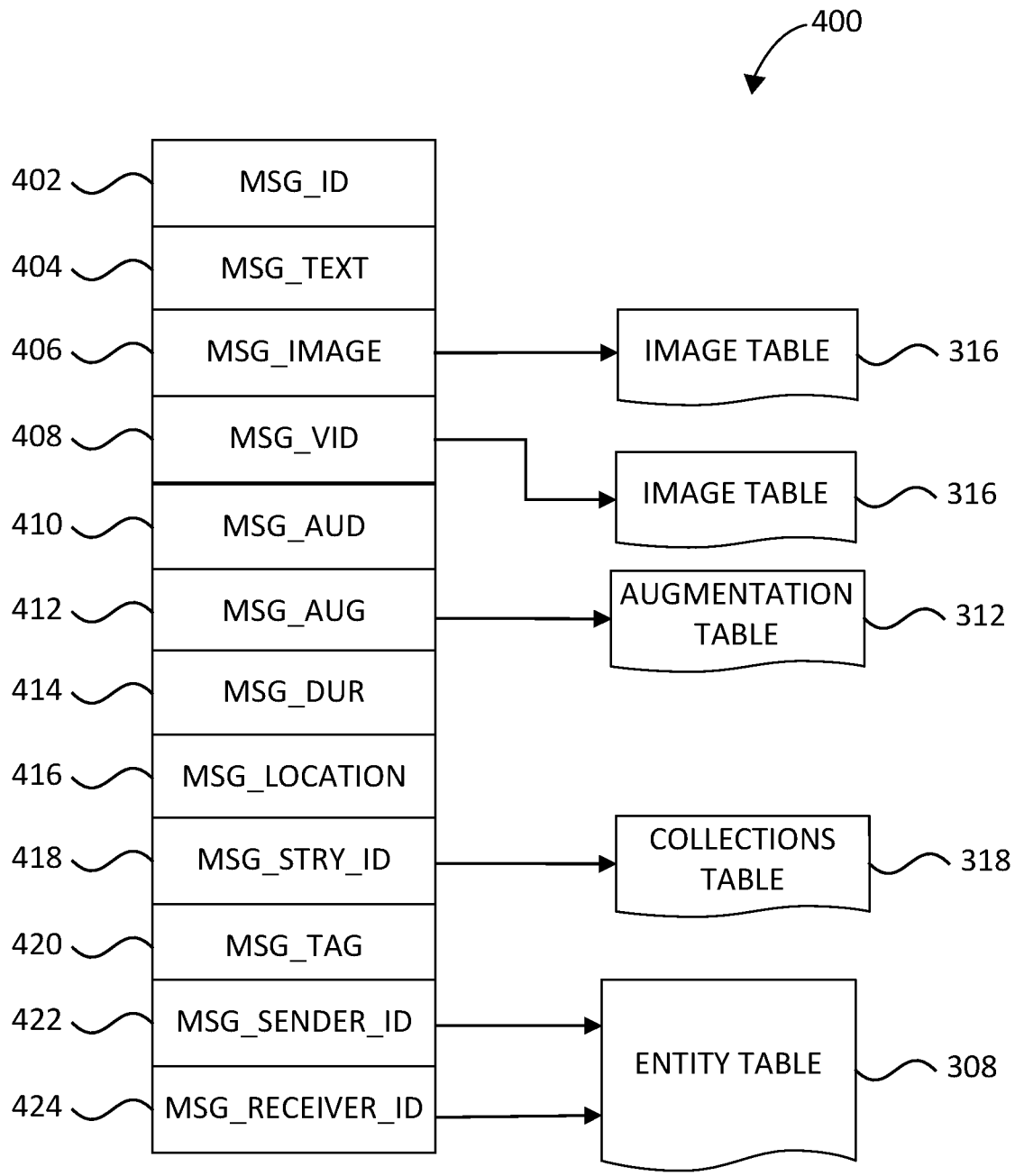
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Mesh Generation System

Figure 5:
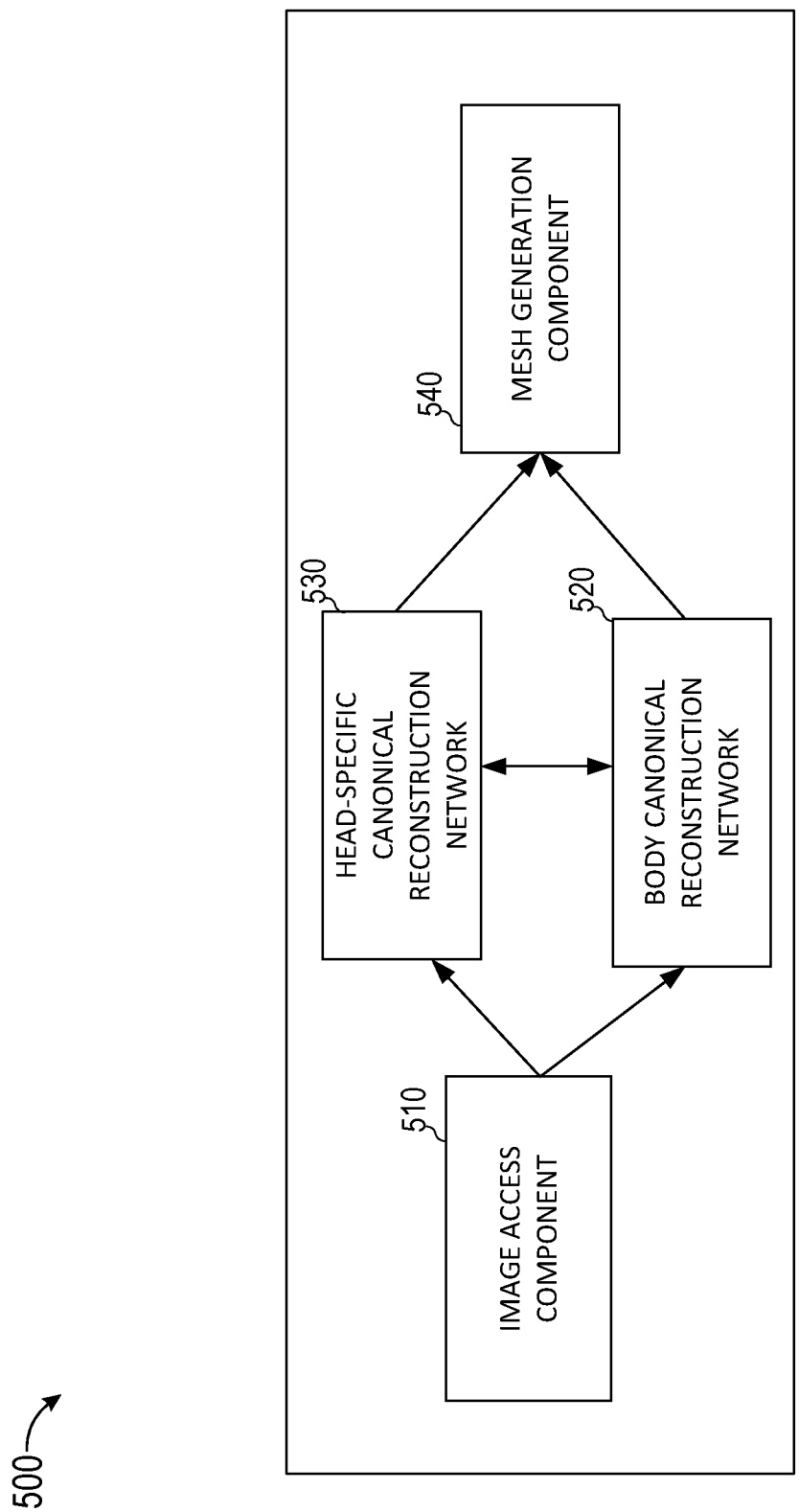
FIG. 5 is a diagrammatic representation of mesh generation system, in accordance with some examples.

FIG. 5 is a block diagram showing an example mesh generation system 500, according to some examples. The mesh generation system 500 receives a 2D image that depicts an object, such as a human person, and generates a 3D mesh representing the object using a combination of multiple machine learning models. Particularly, the mesh generation system 500 uses a first machine learning model to predict a volumetric reconstruction tensor and a pose output representing a pose of the object depicted in the image simultaneously or together. The mesh generation system 500 accesses a canonical body reconstruction (e.g., a canonical pose) in the canonical space and identifies a pixel or point in the volumetric reconstruction tensor that corresponds to a particular point in the canonical pose using the pose output. The mesh generation system 500 then classifies the identified pixel or point as being inside or outside of the canonical pose. After iterating through every single point in the canonical pose in this manner, the mesh generation system 500 classifies all of the points in the volumetric reconstruction tensor as being inside or outside of the canonical pose. The points that are determined to be inside the canonical pose are then used to generate a 3D mesh which can be animated to provide one or more XR experiences.

In some examples, the mesh generation system 500 accesses a monocular image depicting an object. The mesh generation system 500 predicts both a volumetric reconstruction tensor of the monocular image and a pose of the object by applying a first machine learning model to the monocular image. The mesh generation system 500 identifies a portion of the pose of the object that corresponds to a point in a canonical space associated with a set of position encoding information. The mesh generation system 500 obtains a point of the volumetric reconstruction tensor corresponding to the identified portion of the pose. The mesh generation system 500 classifies the obtained point as being inside or outside of a canonical volume by applying a second machine learning model to the obtained point of the volumetric reconstruction tensor together with the set of position encoding information. The mesh generation system 500 generates a 3D mesh representing the object in the canonical space in response to classifying the obtained point as being inside or outside of the canonical volume.

In some examples, the pose of the object includes a skeletal representation of the object. In some examples, the mesh generation system 500 selects the point in the canonical space associated with the set of position encoding information. In some examples, the mesh generation system 500 selects a second portion of the pose of the object that corresponds to a second point in the canonical space associated with a second set of position encoding information. The mesh generation system 500 obtains a second point of the volumetric reconstruction tensor corresponding to the second portion of the pose. The mesh generation system 500 classifies the second point as being inside or outside of the canonical volume by applying the second machine learning model to the second point of the volumetric reconstruction tensor together with the second set of position encoding information.

In some examples, the mesh generation system 500 repeats selection of portions of the pose and classification of points of the volumetric reconstruction tensor corresponding to the selected portions of the pose as being inside or outside of the canonical volume for each portion of the canonical volume. In some examples, the set of position encoding information represents different body parts of the canonical volume, such as arms, legs, torso, head, hands, feet, and so forth.

In some examples, the mesh generation system 500 trains the first and second machine learning models by performing training operations. These training operations include obtaining a set of training images depicting objects. Each of the set of training images is associated with 3D scans of the objects depicted in the set of training images and generate ground truth canonical space representations of the objects depicted in the set of training images by modifying poses of the 3D scans of the objects to correspond to a pose in the canonical space.

In some examples, the training operations include selecting a first training image depicting a first object corresponding to a first of the ground truth canonical space representations of the first object. The training operations include predicting both an individual volumetric reconstruction tensor of the monocular image and an individual pose of the first object by applying the first machine learning model to the first training image. The training operations include identifying an individual portion of the individual pose of the first object that corresponds to an individual point in the canonical space associated with an individual set of position encoding information. The training operations include obtaining an individual point of the individual volumetric reconstruction tensor corresponding to the individual portion. The training operations include classifying the individual point as being inside or outside of an individual canonical volume by applying the second machine learning model to the individual point of the volumetric reconstruction tensor together with the individual set of position encoding information. The training operations include generating occupancy loss based on a deviation between a classification resulting from classifying the individual point and a corresponding portion of the first ground truth canonical space representation of the object. In some examples, the mesh generation system 500 updates one or more parameters of the first and second machine learning models based on the occupancy loss.

In some examples, the training operations include generating an individual 3D mesh representing the first object in the canonical space in response to classifying the individual point as being inside or outside of the canonical volume. The training operations include posing the individual 3D mesh based on the individual pose of the first object predicted by the first machine learning model and computing a posed loss based on a deviation between the posed individual 3D mesh and the 3D scan of the first object. In some examples, the mesh generation system 500 updates one or more parameters of the first and second machine learning models based on the posed loss.

In some examples, the mesh generation system 500 crops a portion of the monocular image corresponding to a head of the object and generates, based on the cropped portion of the monocular image, facial landmarks of the head of the object. The mesh generation system 500 predicts a head-specific canonical space reconstruction by applying a head-specific canonical network to the cropped portion based on the generated facial landmarks. The mesh generation system 500 combines the head-specific canonical space reconstruction with the canonical volume corresponding to the object.

In some examples, the mesh generation system 500 selects a facial landmark in a head-specific canonical space representation of the object. The mesh generation system 500 identifies a specific portion of the object depicted in the cropped portion of the monocular image that corresponds to the selected facial landmark. The mesh generation system 500 obtains an individual point of the volumetric reconstruction tensor corresponding to the specific portion and classifies the obtained individual point as being inside or outside of the head-specific canonical space representation of the object by applying a third machine learning model to the obtained individual point. The mesh generation system 500 generates the head-specific canonical space reconstruction in response to classifying the obtained individual point as being inside or outside of the head-specific canonical space representation.

In some examples, the mesh generation system 500 predicts both an additional volumetric reconstruction tensor of the cropped portion of the monocular image and a head pose of the object by applying a fourth machine learning model to the cropped portion of the monocular image. The individual point can be obtained from the additional volumetric reconstruction tensor. In some examples, the mesh generation system 500 updates a pose of a head region in the canonical volume based on the facial landmarks. The 3D mesh is generated using the canonical volume with the updated pose of the head region.

In some examples, the canonical volume represents a full body canonical space reconstruction of the object. The mesh generation system 500 identifies a region in which the full body canonical space reconstruction of the object overlaps with the head-specific canonical space reconstruction. The mesh generation system 500 smoothly deforms (e.g., by integrating values of) the region based on differences between the full body canonical space reconstruction of the object and the head-specific canonical space reconstruction. In some examples, the mesh generation system 500 generates the 3D mesh based on the full body canonical space reconstruction, the head-specific canonical space reconstruction, and/or the smoothly deformed region.

In some examples, the mesh generation system 500 generates an XR object based on the 3D mesh. In some examples, the mesh generation system 500 animates the XR object in an XR view of a real-world environment captured in real time by a camera of the user system 102.

For example, the mesh generation system 500 includes an image access component 510. The image access component 510 can access a real-time or previously stored image or video from the user system 102. The image access component 510 can select a frame or collection of frames from the accessed image or video for use in generating a 3D mesh of one or more real-world or XR objects depicted in the selected frame or collection of frames. During training of the mesh generation system 500, the image access component 510 accesses a database of training data to retrieve images depicting real-world objects and their corresponding ground truth 3D scans to train one or more machine learning models of the mesh generation system 500.

During operation (e.g., after being trained), the image access component 510 provides the image depicting the object simultaneously or sequentially to a body canonical reconstruction network 520 and/or to a head-specific canonical reconstruction network 530. The body canonical reconstruction network 520 includes a first plurality of machine learning models (e.g., first and second machine learning models) that are trained to process a received image and generate a canonical representation of the object depicted in the received image. The operations performed by the body canonical reconstruction network 520 are described in more detail in connection with FIG. 6 below. The head-specific canonical reconstruction network 530 includes a second plurality of machine learning models (e.g., third and fourth machine learning models) that are trained to process a received image, crop a portion of the image corresponding to a head, such as based on an output of the first and/or second machine learning models, and generate a head-specific canonical representation of only the head portion of the object depicted in the received image. In this way, the body canonical reconstruction network 520 provides or generates a generic and general body representation of the object depicted in the image in canonical space and the head-specific canonical reconstruction network 530 generates a head-specific representation of the facial features and head of the object depicted in the image, which includes a very detailed representation of the head and face of the object.

The outputs of the head-specific canonical reconstruction network 530 and the body canonical reconstruction network 520 are provided to a mesh generation component 540. The mesh generation component 540 combines a body portion of the body representation of the object (e.g., excluding the head) with the head portion of the head-specific representation of the object (e.g., excluding a neck which may be included in the output of the head-specific canonical reconstruction network 530). The mesh generation component 540 can identify a region of the body representation that overlaps a region of the head-specific representation. For example, the mesh generation component 540 can determine that a neck in the head-specific representation is also included in the body representation. This overlap region can be interpolated or smoothed to smooth out or interpolate any differences between the overlapping regions. The mesh generation component 540 then includes this smoothed region in the combined reconstruction of the object formed by the body representation and head-specific representation to form a final representation of the object depicted in the image. The mesh generation component 540 generates a 3D mesh using the final representation of the object and applies the 3D mesh to a character or avatar depicted in an image to provide an XR experience. The mesh generation component 540 animates the character or avatar based on movement of the person depicted in the image.

Figure 6:
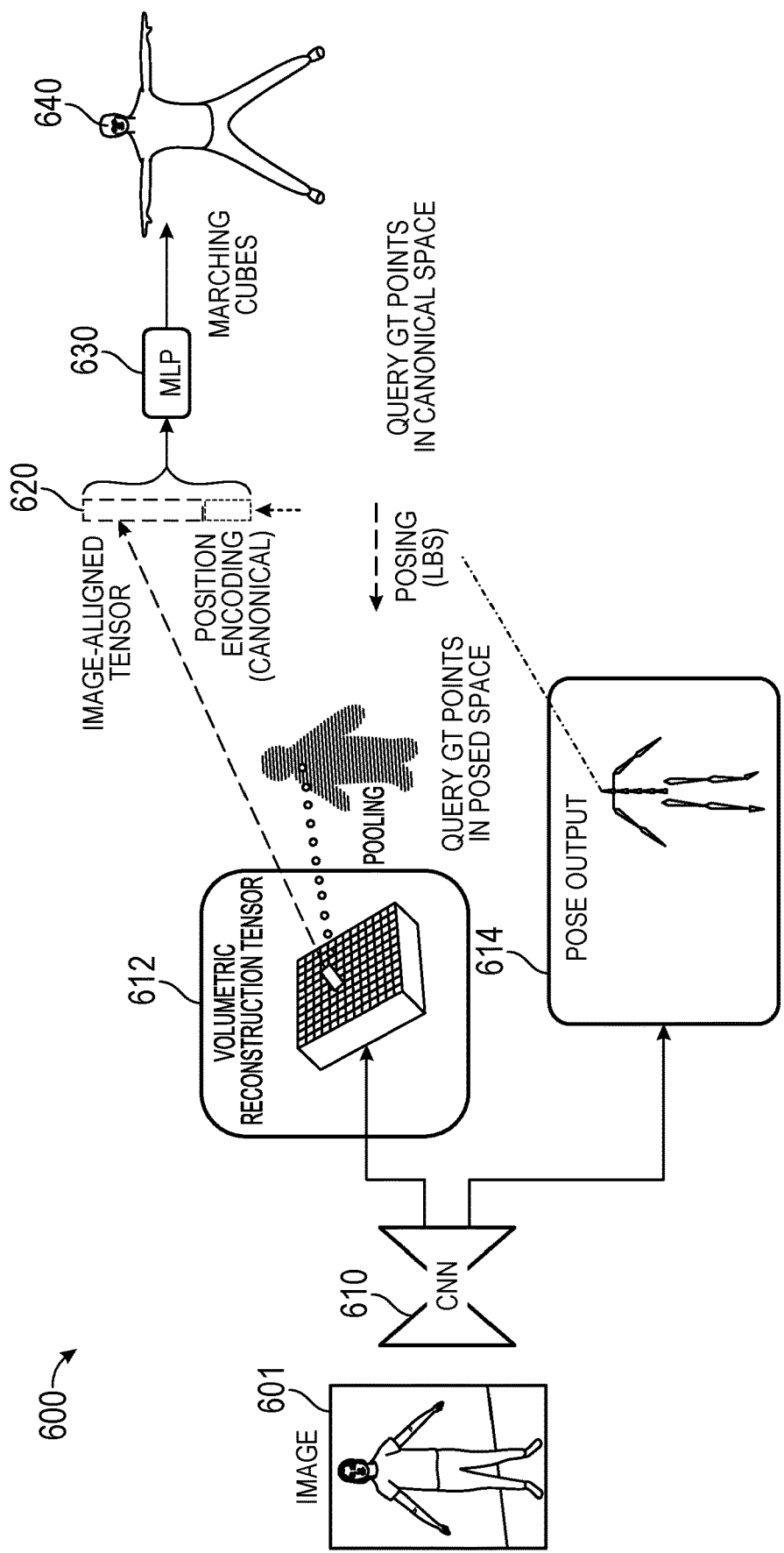
FIG. 6 is a diagrammatic representation of a full body canonical space reconstruction system, in accordance with some examples.

FIG. 6 is a diagrammatic representation of a full body canonical space reconstruction system 600, in accordance with some examples. Specifically, the full body canonical space reconstruction system 600 can implement some or all of the components of the body canonical reconstruction network 520. The full body canonical space reconstruction system 600 includes an image 601 that can be received from the image access component 510. The image 601 can depict an object, such as a person and a background. The full body canonical space reconstruction system 600 includes a first machine learning model 610. The first machine learning model 610 processes the image 601 and simultaneously outputs both a volumetric reconstruction tensor 612 and a pose output 614. The volumetric reconstruction tensor 612 is a tensor of estimated pixel values of each point of the image 601. In some cases, the volumetric reconstruction tensor 612 provides estimated pixel values of 3D or estimated 3D points of various portions of the image 601. The volumetric reconstruction tensor 612 can be a mathematical representation of a 3D scene or object using a four-dimensional (4D) tensor, which is a multidimensional array of numbers. This tensor can capture the spatial and angular information of the scene or object, such as its shape, color, and lighting.

The pose output 614 includes a skeleton with various bones arranged to represent a current pose of the object depicted in the image 601. The bones of the skeleton included in the pose output 614 can be arranged to mimic a look of the skeletal features of the object, such as the person, depicted in the image 601. In some examples, the full body canonical space reconstruction system 600 accesses a canonical pose 640 representing a pose of an object in the canonical space. In some cases, the canonical pose 640 can correspond to a T-pose of an object, where the arms are stretched out extending as far away from the body of the object as possible and the legs are also stretched open. The canonical pose 640 can differ from the pose output 614. In some cases, the canonical pose can be any other type of pose and is not limited to a T-pose.

The full body canonical space reconstruction system 600 selects a particular portion of the canonical pose 640, such as a torso or hand portion of the canonical pose 640. The full body canonical space reconstruction system 600 identifies a set of positional encoding information corresponding to the selected particular portion. The set of positional encoding information can specify the collection of points and their locations for the particular portion. Namely, a first set of positional encoding information can identify or specify locations of points on the canonical pose 640 corresponding to a first body part, such as torso. A second set of positional encoding information can identify or specify locations of points on the canonical pose 640 corresponding to a second body part, such as legs.

The full body canonical space reconstruction system 600 can select a particular point from the particular portion of the canonical pose 640. The full body canonical space reconstruction system 600 can then access the pose output 614 to identify the portion of the pose output 614 that corresponds to the particular portion of the canonical pose 640 that was selected. For example, if a torso was selected from the canonical pose 640, the full body canonical space reconstruction system 600 can identify the torso region of the pose output 614. The full body canonical space reconstruction system 600 can select or identify a point within the pose output 614 that corresponds to the selected point of the particular portion of the canonical pose 640.

The full body canonical space reconstruction system 600 uses the selected point of the pose output 614 to retrieve a point or set of points from the volumetric reconstruction tensor 612 that match the selected point of the pose output 614. In some cases, the full body canonical space reconstruction system 600 repeats the above process for each point and for each portion of the canonical pose 640 to form a signal 620 that includes an image-aligned tensor and position encoding values corresponding to each selected particular portion of the canonical pose 640. For example, the full body canonical space reconstruction system 600 can select a collection of points from a second portion of the canonical pose 640 associated with a second set of positional encoding information. The full body canonical space reconstruction system 600 can identify which portion of the pose output 614 corresponds to the second portion of the canonical pose 640 and use that portion to retrieve the pixel values from the volumetric reconstruction tensor 612. The retrieved pixel values are then stored in the signal 620 in association with the second set of positional encoding information. After all of the portions of the canonical pose 640 are processed in this manner to identify, retrieve, and associate each pixel in the volumetric reconstruction tensor 612 with the corresponding positional encoding information, the signal 620 is generated.

The full body canonical space reconstruction system 600 can then provide the signal 620 that includes an image-aligned tensor and position encoding values corresponding to one or more portions (or all portions) of the canonical pose 640 to a second machine learning model 630. The second machine learning model 630 classifies each of the points in the signal 620 as being inside or outside of the canonical pose 640. After the points of the volumetric reconstruction tensor 612 are all classified, the full body canonical space reconstruction system 600 outputs the pixel values that are classified as being inside of the canonical pose 640 to form the body representation of the object depicted in the image 601. Namely, this body representation corresponds to the output of the body canonical reconstruction network 520.

Figure 7:
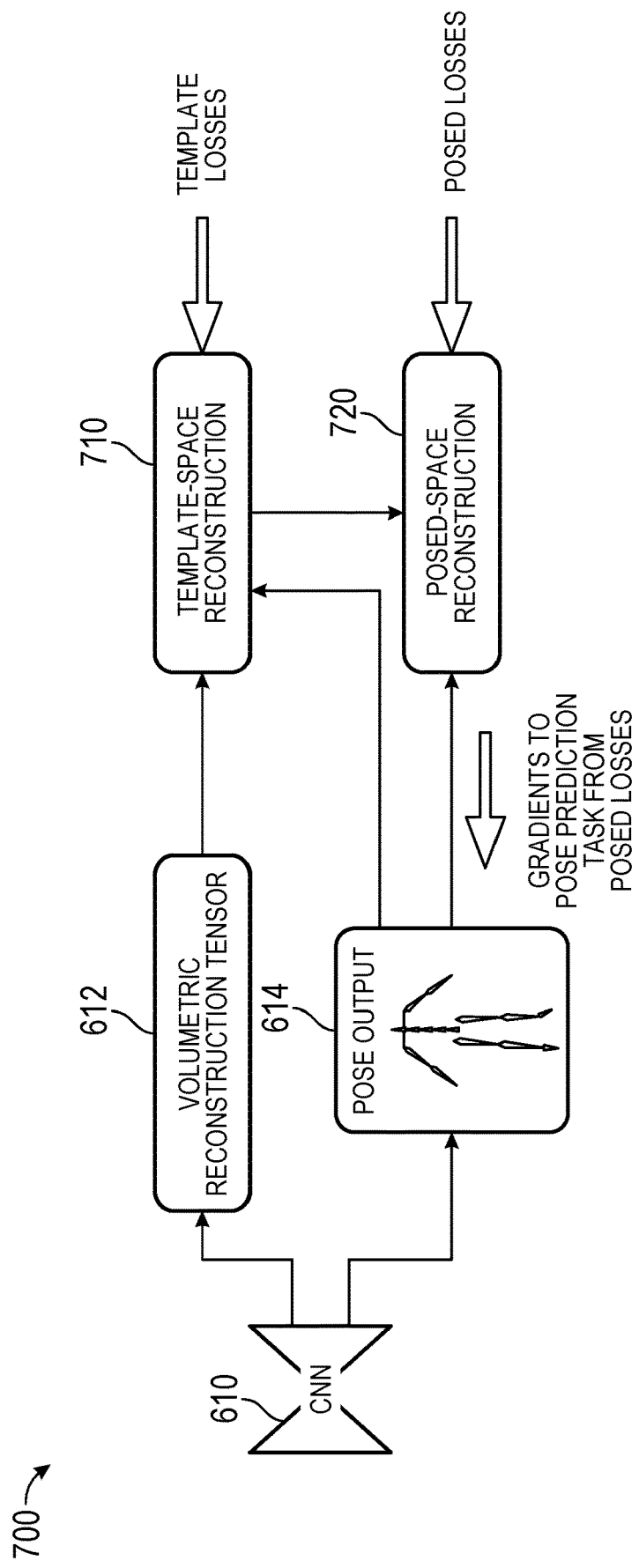
FIG. 7 is a diagrammatic representation of training losses for the full body canonical space reconstruction system, in accordance with some examples.

In some examples, the full body canonical space reconstruction system 600 is trained using training data received from the image access component 510. The full body canonical space reconstruction system 600 can be trained using multiple types of training losses including a template loss and posed loss. FIG. 7 is a diagrammatic representation 700 of training losses for the full body canonical space reconstruction system 600, in accordance with some examples.

As shown in FIG. 7, to train the full body canonical space reconstruction system 600, the full body canonical space reconstruction system 600 retrieves a first training image that depicts a person and the corresponding 3D scan of the person. The full body canonical space reconstruction system 600 generates a ground truth canonical pose representing the person using the 3D scan. The full body canonical space reconstruction system 600 then processes the first training image using the first machine learning model 610 to generate a training volumetric reconstruction tensor 612 and the corresponding pose output 614 representing the current pose of the person depicted in the first training image. The full body canonical space reconstruction system 600 selects points along the canonical pose (e.g., the ground truth canonical pose representing the person) and uses those points to retrieve corresponding collections of points from the volumetric reconstruction tensor 612 based on the pose output 614.

Namely, the full body canonical space reconstruction system 600 forms a signal representing all of the points from the volumetric reconstruction tensor 612 that are associated with different portions of the canonical pose. To do so, the full body canonical space reconstruction system 600 can select an arm portion of the canonical pose and use the pose output 614 to determine which portion or set of pixels in the volumetric reconstruction tensor 612 correspond to the arm portion. Those pixels are then inserted into a signal and associated with the arm portion. This process is repeated for the leg portion, torso portion, and all other portions of the canonical pose until all portions are associated with position encoding information (e.g., labeled) for the corresponding pixel values of the volumetric reconstruction tensor 612. The full body canonical space reconstruction system 600 then applies the second machine learning model 630 to the signal that includes the pixels and the associated positional encoding information to classify the pixel values as being inside or outside of the canonical space. The full body canonical space reconstruction system 600 retrieves the pixels classified as being within the canonical space and compares those values with the ground truth pixel values from the ground truth canonical space representation of the person. The full body canonical space reconstruction system 600 computes a deviation between the pixels classified as being within the canonical space and the ground truth pixel values from the ground truth canonical space representation of the person. This deviation is used to generate an occupancy loss (e.g., the template-space reconstruction loss 710) which is used to update one or more parameters of the first machine learning model 610 and/or the second machine learning model 630. In this way, the first machine learning model 610 that generates both the pose output 614 and the volumetric reconstruction tensor 612 is updated using the same training loss, which improves the overall accuracy and efficiency of generating these signals.

In some examples, the full body canonical space reconstruction system 600 generates a 3D training mesh using the pixels classified as being within the canonical space. The 3D training mesh is posed based on the pose output 614 of the first training image. The 3D training mesh is then compared with the 3D scan of the person depicted in the first training image to generate a posed-space reconstruction loss 720. A deviation resulting from this comparison is used to generate a posed loss, which is used to update one or more parameters of the first machine learning model 610 and/or the second machine learning model 630. In this way, the first machine learning model 610 that generates both the pose output 614 and the volumetric reconstruction tensor 612 is updated using this additional training loss, which improves the overall accuracy and efficiency of generating these signals.

Figure 8:
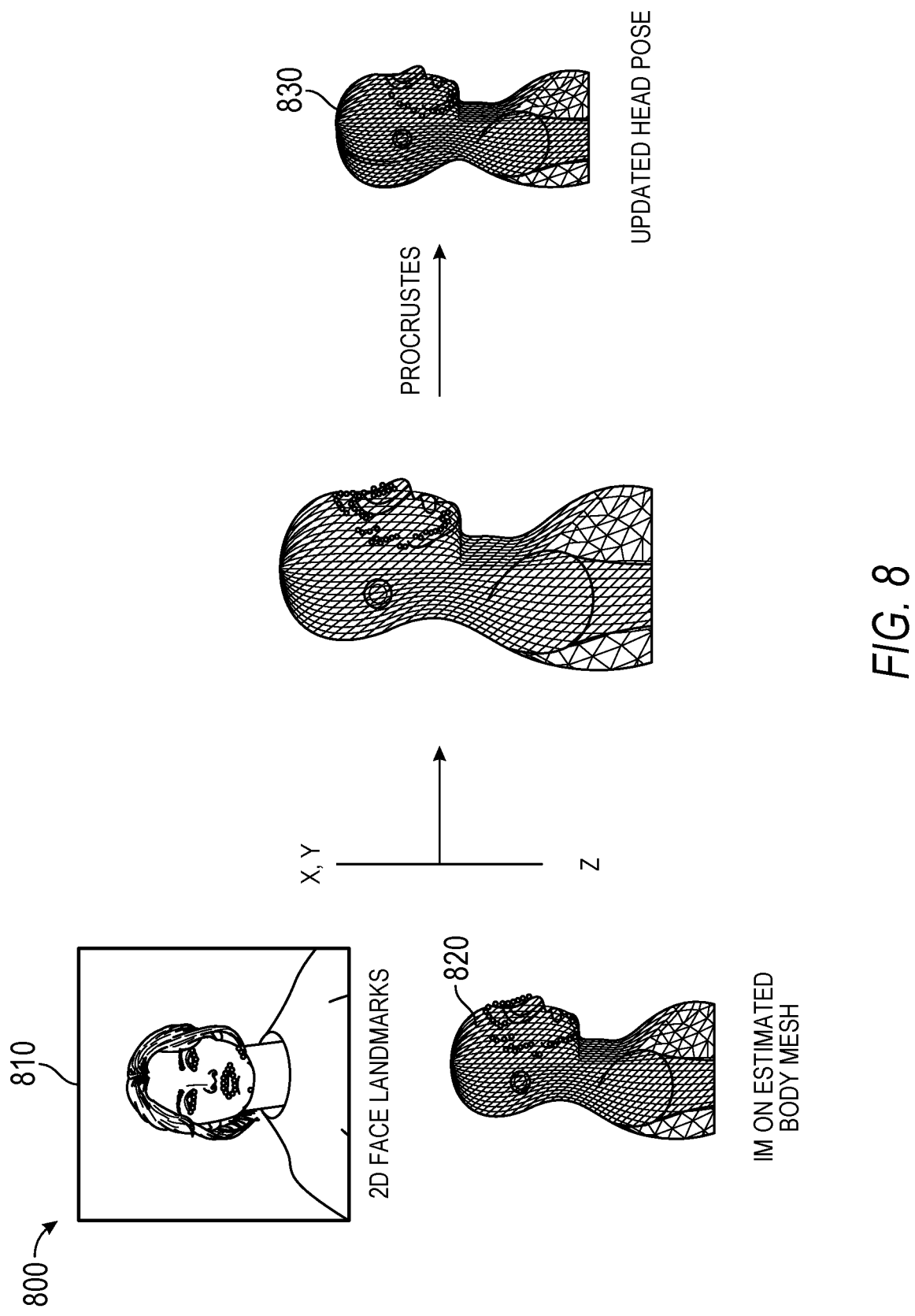
FIG. 8 is a diagrammatic representation of head pose refinement for the full body canonical space reconstruction system, in accordance with some examples.

FIG. 8 is a diagrammatic representation 800 of head pose refinement for the full body canonical space reconstruction system, in accordance with some examples. Specifically, the head-specific canonical reconstruction network 530 can process the image received from the image access component 510 to crop a region 810 of the image that corresponds to the head portion of the object depicted in the image. The head-specific canonical reconstruction network 530 can use the pose output 614 received from the signal 620 to select the portion of the image corresponding to the head and/or can use any other image recognition techniques to retrieve and identify the portion of the image corresponding to the head.

The head-specific canonical reconstruction network 530 can process the cropped region 810 of the image to identify 2D facial landmarks of the head depicted in the cropped region 810 of the image. These 2D facial landmarks can be provided to the body canonical reconstruction network 520 to update a pose of the head generated by the body canonical reconstruction network 520. Namely, a 3D mesh can be generated using the output of the body canonical reconstruction network 520, such as mesh 820. The mesh 820 can then be updated, such as by refining or modifying a pose of the head portion, to generate a new mesh 830 in which the head pose is modified based on the 2D facial landmarks detected in the cropped region 810.

In some examples, the head-specific canonical reconstruction network 530 can process the cropped region 810 in parallel with or sequentially after the body canonical reconstruction network 520 is used to generate the canonical body representation of the object depicted in the image received from the image access component 510. The head-specific canonical reconstruction network 530 can perform a similar process as the body canonical reconstruction network 520 to generate a head-specific canonical representation of the head depicted in the cropped region 810. For example, the head-specific canonical reconstruction network 530 can implement a third machine learning model (which can perform functions similar to the first machine learning model 610 but specific to a head portion of a person). The third machine learning model processes the cropped region 810 and simultaneously outputs both a head-specific volumetric reconstruction tensor and a head-specific pose output.

In some examples, the head-specific canonical reconstruction network 530 accesses a head-specific canonical pose representing a pose of a head of an object in the canonical space. The head-specific canonical reconstruction network 530 selects a facial feature of the head-specific canonical pose, such as eyes or a mouth portion of the head-specific canonical pose. The head-specific canonical reconstruction network 530 identifies a set of head-specific positional encoding information corresponding to the selected facial feature. The set of positional encoding information can specify the collection of points and their locations for the particular facial feature. The head-specific canonical reconstruction network 530 can then access the head-specific pose output 614 to identify the portion of the head-specific pose output 614 that corresponds to the particular facial feature of the head-specific canonical pose that was selected. The head-specific canonical reconstruction network 530 uses the selected point of the head-specific pose output to retrieve a point or set of points from the head-specific volumetric reconstruction tensor that match the selected point of the head-specific pose output. In some cases, the head-specific canonical reconstruction network 530 repeats the above process for each point and for each facial feature of the head-specific canonical pose to form a signal that includes an image-aligned head-specific tensor and position encoding values corresponding to each selected particular facial feature of the head-specific canonical pose. After all of the facial features of the head-specific canonical pose are processed in this manner to identify, retrieve, and associate each pixel in the head-specific volumetric reconstruction tensor with the corresponding positional encoding information, the head-specific signal is generated.

The head-specific canonical reconstruction network 530 can then provide the head-specific signal that includes an image-aligned head-specific tensor and position encoding values corresponding to one or more facial features (or all facial features) of the head-specific canonical pose to a fourth machine learning model. The fourth machine learning model classifies each of the points in the head-specific signal as being inside or outside of the head-specific canonical pose. After the points of the head-specific volumetric reconstruction tensor are all classified, the head-specific canonical reconstruction network 530 outputs the pixel values that are classified as being inside of the head-specific canonical pose to form the head-specific representation of the object depicted in the image.

In some examples, the head-specific canonical space reconstruction system is trained using the same or different training data as that used to train the full body canonical space reconstruction system 600. To train the head-specific canonical space reconstruction system, the head-specific canonical space reconstruction system retrieves a first training image that depicts a head of a person and the corresponding 3D scan of the person. The head-specific canonical space reconstruction system generates a ground truth canonical head-specific pose representing the head of the person using the 3D scan. The head-specific canonical space reconstruction system then processes the first training image using the third machine learning model to generate a training head-specific volumetric reconstruction tensor and the corresponding head-specific pose output representing the current head-specific pose of the person depicted in the first training image. The head-specific canonical space reconstruction system selects points along the head-specific canonical pose (e.g., the ground truth canonical pose representing the head of the person) and uses those points to retrieve corresponding collections of points from the head-specific volumetric reconstruction tensor based on the head-specific pose output 614.

The head-specific canonical space reconstruction system then applies the fourth machine learning model to the signal that includes the pixels and the associated positional encoding information specific to the head to classify the pixel values as being inside or outside of the head-specific canonical space. The head-specific canonical space reconstruction system retrieves the pixels classified as being within the head-specific canonical space and compares those values with the ground truth pixel values from the ground truth head-specific canonical space representation of the person. The head-specific canonical space reconstruction system computes a deviation between the pixels classified as being within the head-specific canonical space and the ground truth pixel values from the ground truth head-specific canonical space representation of the person. This deviation is used to generate a head-specific occupancy loss which is used to update one or more parameters of the third machine learning model and/or the fourth machine learning model.

Figure 9:
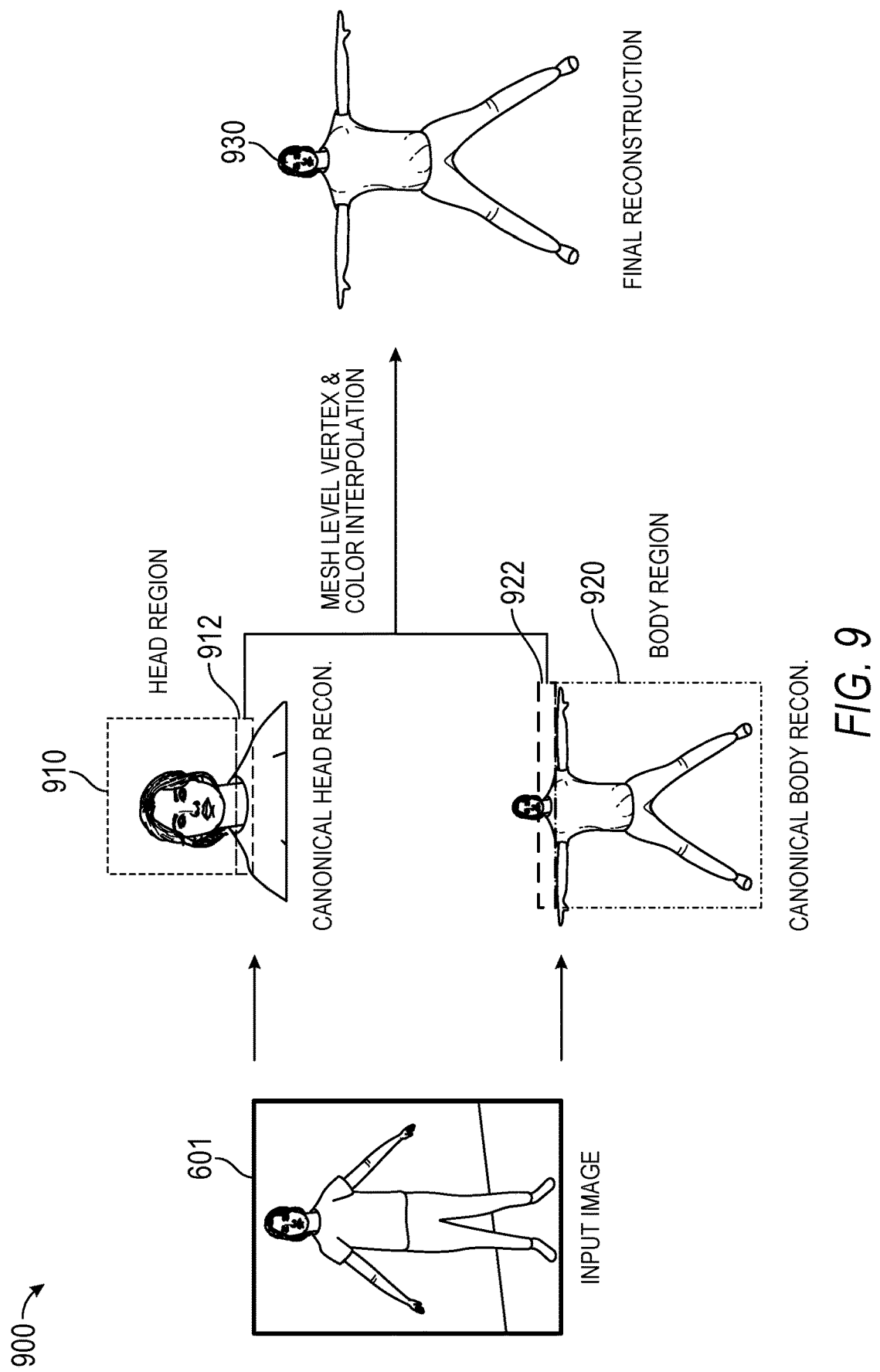
FIG. 9 is a diagrammatic representation of a mesh generation component of the full body canonical space reconstruction system, in accordance with some examples.

FIG. 9 is a diagrammatic representation 900 of a mesh generation component of the full body canonical space reconstruction system, in accordance with some examples. Specifically, as shown in FIG. 9, the input image 601 can be processed by the body canonical reconstruction network 520 and the head-specific canonical reconstruction network 530 to generate a head-specific canonical representation 910 of the object depicted in the image 601 and a full body canonical representation 920 of the object depicted in the image 601. The mesh generation system 500 can use the head portion of the head-specific canonical representation 910 and the body portion of the full body canonical representation 920 to generate a final reconstruction 930 of the object depicted in the image 601. In particular, the mesh generation system 500 can select a threshold region of the head-specific canonical representation 910 (e.g., a top of a person's neck) which is used to cut off the portions of the head-specific canonical representation 910 used to form the final reconstruction 930. Similarly, the mesh generation system 500 can select another threshold region of the full body canonical representation 920 (e.g., a bottom of the person's neck) which is used to cut off the portions of the full body canonical representation 920 used to form the final reconstruction 930. The mesh generation system 500 can determine that a region 912 of the head-specific canonical representation 910 overlaps with a region 922 of the full body canonical representation 920. Namely, both the head-specific canonical representation 910 and the full body canonical representation 920 can include a neck region. The mesh generation system 500 can interpolate differences between the overlapping portions to smooth out the pixel values and use those smoothed pixel values to generate the final reconstruction 930. The final reconstruction 930 can then be used to form a 3D mesh of the object depicted in the image 601.

Figure 10:
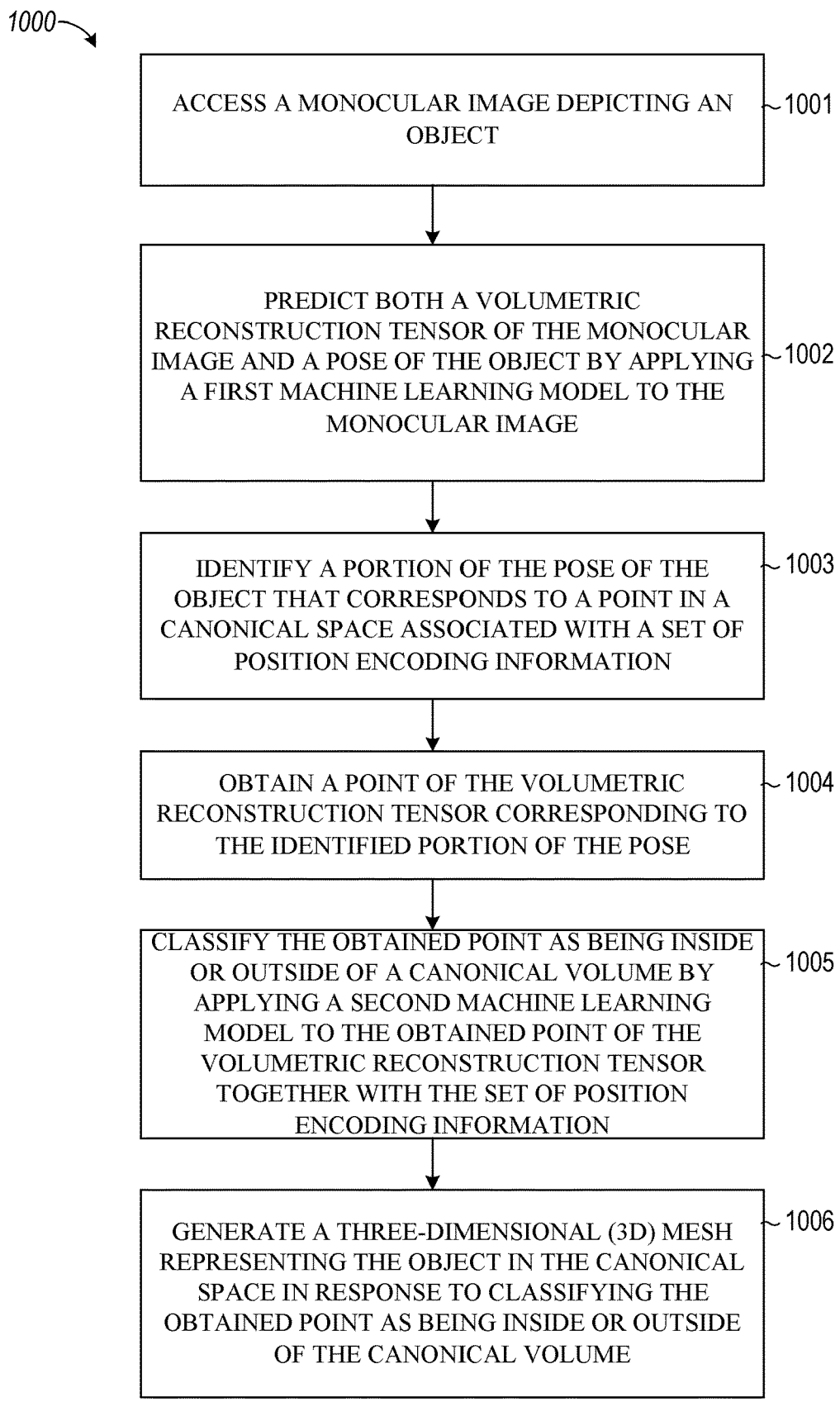
FIG. 10 is a flowchart illustrating example operations of the mesh generation system, in accordance with some examples.

FIG. 10 is a flowchart of a process 1000 performed by the mesh generation system 500, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, the mesh generation system 500 (e.g., a user system 102 or a server) accesses a monocular image depicting an object, as discussed above.

At operation 1002, the mesh generation system 500 predicts both a volumetric reconstruction tensor of the monocular image and a pose of the object by applying a first machine learning model to the monocular image, as discussed above.

At operation 1003, the mesh generation system 500 identifies a portion of the pose of the object that corresponds to a point in a canonical space associated with a set of position encoding information, as discussed above.

At operation 1004, the mesh generation system 500 obtains a point of the volumetric reconstruction tensor corresponding to the identified portion of the pose, as discussed above.

At operation 1005, the mesh generation system 500 classifies the obtained point as being inside or outside of a canonical volume by applying a second machine learning model to the obtained point of the volumetric reconstruction tensor together with the set of position encoding information, as discussed above.

At operation 1006, the mesh generation system 500 generates a 3D mesh representing the object in the canonical space in response to classifying the obtained point as being inside or outside of the canonical volume, as discussed above.

EXAMPLES

Example 1

A method comprising: accessing a monocular image depicting an object; predicting both a volumetric reconstruction tensor of the monocular image and a pose of the object by applying a first machine learning model to the monocular image; identifying a portion of the pose of the object that corresponds to a point in a canonical space associated with a set of position encoding information; obtaining a point of the volumetric reconstruction tensor corresponding to the identified portion of the pose; classifying the obtained point as being inside or outside of a canonical volume by applying a second machine learning model to the obtained point of the volumetric reconstruction tensor together with the set of position encoding information; and generating a 3D mesh representing the object in the canonical space in response to classifying the obtained point as being inside or outside of the canonical volume.

Example 2

The method of Example 1, wherein the pose of the object comprises a skeletal representation of the object.

Example 3

The method of any one of Examples 1-2, further comprising: selecting the point in the canonical space associated with the set of position encoding information.

Example 4

The method of any one of Examples 1-3, further comprising: selecting a second portion of the pose of the object that corresponds to a second point in the canonical space associated with a second set of position encoding information; obtaining a second point of the volumetric reconstruction tensor corresponding to the second portion of the pose; and classifying the second point as being inside or outside of the canonical volume by applying the second machine learning model to the second point of the volumetric reconstruction tensor together with the second set of position encoding information.

Example 5

The method of Example 4, further comprising repeating selection of portions of the pose and classification of points of the volumetric reconstruction tensor corresponding to the selected portions of the pose as being inside or outside of the canonical volume for each portion of the canonical volume.

Example 6

The method of any one of Examples 1-5, wherein the set of position encoding information represents different body parts of the canonical volume.

Example 7

The method of any one of Examples 1-6, further comprising training the first and second machine learning models by performing training operations comprising: obtaining a set of training images depicting objects, each of the set of training images being associated with 3D scans of the objects depicted in the set of training images; and generating ground truth canonical space representations of the objects depicted in the set of training images by modifying poses of the 3D scans of the objects to correspond to a pose in the canonical space.

Example 8

The method of Example 7, wherein the training operations comprise: selecting a first training image depicting a first object corresponding to a first of the ground truth canonical space representations of the first object; predicting both an individual volumetric reconstruction tensor of the monocular image and an individual pose of the first object by applying the first machine learning model to the first training image; identifying an individual portion of the individual pose of the first object that corresponds to an individual point in the canonical space associated with an individual set of position encoding information; obtaining an individual point of the individual volumetric reconstruction tensor corresponding to the individual portion; classifying the individual point as being inside or outside of an individual canonical volume by applying the second machine learning model to the individual point of the volumetric reconstruction tensor together with the individual set of position encoding information; and generating occupancy loss based on a deviation between a classification resulting from classifying the individual point and a corresponding portion of the first ground truth canonical space representation of the object.

Example 9

The method of Example 8, further comprising updating one or more parameters of the first and second machine learning models based on the occupancy loss.

Example 10

The method of any one of Examples 8-9, further comprising: generating an individual 3D mesh representing the first object in the canonical space in response to classifying the individual point as being inside or outside of the canonical volume; posing the individual 3D mesh based on the individual pose of the first object predicted by the first machine learning model; and computing a posed loss based on a deviation between the posed individual 3D mesh and the 3D scan of the first object.

Example 11

The method of any one of Examples 1-10, further comprising: cropping a portion of the monocular image corresponding to a head of the object; generating, based on the cropped portion of the monocular image, facial landmarks of the head of the object; predicting a head-specific canonical space reconstruction by applying a head-specific canonical network to the cropped portion based on the generated facial landmarks; and combining the head-specific canonical space reconstruction with the canonical volume corresponding to the object.

Example 12

The method of Example 11, further comprising: selecting a facial landmark in a head-specific canonical space representation of the object; identifying a specific portion of the object depicted in the cropped portion of the monocular image that corresponds to the selected facial landmark; obtaining an individual point of the volumetric reconstruction tensor corresponding to the specific portion; classifying the obtained individual point as being inside or outside of the head-specific canonical space representation of the object by applying a third machine learning model to the obtained individual point; and generating the head-specific canonical space reconstruction in response to classifying the obtained individual point as being inside or outside of the head-specific canonical space representation.

Example 13

The method of Example 12, further comprising: predicting both an additional volumetric reconstruction tensor of the cropped portion of the monocular image and a head pose of the object by applying a fourth machine learning model to the cropped portion of the monocular image, wherein the individual point is obtained from the additional volumetric reconstruction tensor.

Example 14

The method of any one of Examples 11-13, further comprising: updating a pose of a head region in the canonical volume based on the facial landmarks, wherein the 3D mesh is generated using the canonical volume with the updated pose of the head region.

Example 15

The method of any one of Examples 11-14, wherein the canonical volume represents a full body canonical space reconstruction of the object, further comprising: identifying a region in which the full body canonical space reconstruction of the object overlaps with the head-specific canonical space reconstruction; and smoothly deforming the region based on differences between the full body canonical space reconstruction of the object and the head-specific canonical space reconstruction.

Example 16

The method of Example 15, further comprising generating the 3D mesh based on the full body canonical space reconstruction, the head-specific canonical space reconstruction, and the smoothly deformed region.

Example 17

The method of any one of Examples 1-16, further comprising generating an XR object based on the 3D mesh.

Example 18

The method of Example 17, further comprising animating the XR object in a view of a real-world environment captured in real time by a camera of a user system.

Example 19

A system comprising: at least one processor; and at least one memory component having instructions stored thereon that, when executed by the at least one processor, cause the at least one processor to perform operations comprising: accessing a monocular image depicting an object; predicting both a volumetric reconstruction tensor of the monocular image and a pose of the object by applying a first machine learning model to the monocular image; identifying a portion of the pose of the object that corresponds to a point in a canonical space associated with a set of position encoding information; obtaining a point of the volumetric reconstruction tensor corresponding to the identified portion of the pose; classifying the obtained point as being inside or outside of a canonical volume by applying a second machine learning model to the obtained point of the volumetric reconstruction tensor together with the set of position encoding information; and generating a 3D mesh representing the object in the canonical space in response to classifying the obtained point as being inside or outside of the canonical volume.

Example 20

A non-transitory computer-readable storage medium having stored thereon instructions that, when executed by at least one processor, cause the at least one processor to perform operations comprising: accessing a monocular image depicting an object; predicting both a volumetric reconstruction tensor of the monocular image and a pose of the object by applying a first machine learning model to the monocular image; identifying a portion of the pose of the object that corresponds to a point in a canonical space associated with a set of position encoding information; obtaining a point of the volumetric reconstruction tensor corresponding to the identified portion of the pose; classifying the obtained point as being inside or outside of a canonical volume by applying a second machine learning model to the obtained point of the volumetric reconstruction tensor together with the set of position encoding information; and generating a 3D mesh representing the object in the canonical space in response to classifying the obtained point as being inside or outside of the canonical volume.

Machine Architecture

Figure 11:
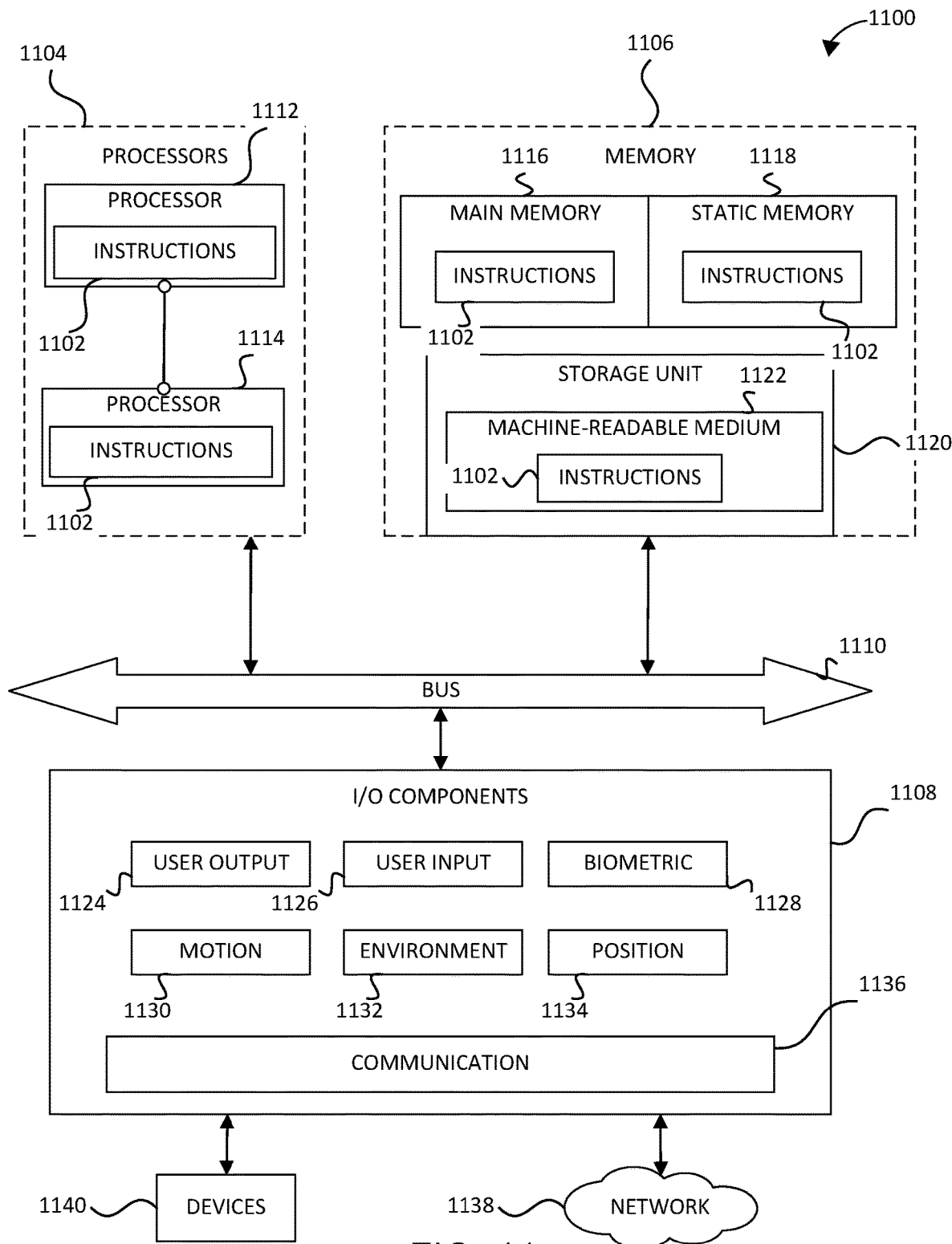
FIG. 11 is a diagrammatic representation of a machine in the form of a computer system within which a set of instructions may be executed to cause the machine to perform any one or more of the methodologies discussed herein, in accordance with some examples.

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine" shall also be taken to include a collection of machines that individually or jointly execute the instructions 1102 to perform any one or more of the methodologies discussed herein. The machine 1100, for example, may comprise the user system 102 or any one of multiple server devices forming part of the interaction server system 110. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output (I/O) components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, all accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like. Any biometric collected by the biometric components is captured and stored with user approval and deleted on user request.

Further, such biometric data may be used for very limited purposes, such as identification verification. To ensure limited and authorized use of biometric information and other personally identifiable information (PII), access to this data is restricted to authorized personnel only, if allowed at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

In further examples, the I/O components 1108 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies include:

Electroencephalography (EEG) based BMIs, which record electrical activity in the brain using electrodes placed on the scalp.

Invasive BMIs, which use electrodes that are surgically implanted into the brain.

Optogenetics BMIs, which use light to control the activity of specific nerve cells in the brain.

The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad, or penta rear camera configurations on the front and rear sides of the user system 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1140 may be another machine or any of a wide variety of peripheral devices (e.g., a peripheral device coupled via a universal serial bus (USB)).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., HTTP). Similarly, the instructions 1102 may be transmitted or received using a transmission medium via a coupling (e.g., a peer-to-peer coupling) to the devices 1140.

Software Architecture

Figure 12:
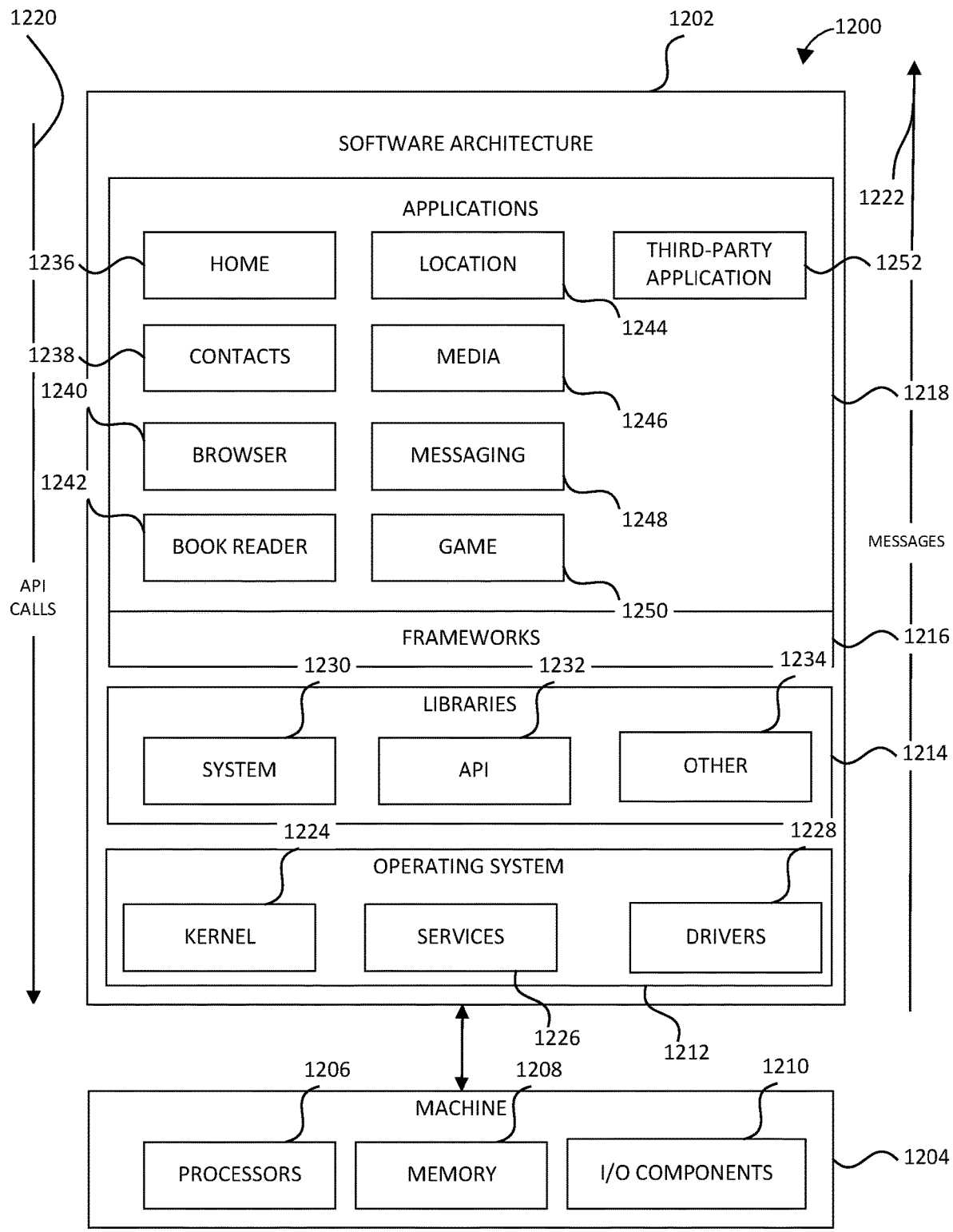
FIG. 12 is a block diagram showing a software architecture within which examples may be implemented.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various GUI functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

System with Head-Wearable Apparatus

Figure 13:
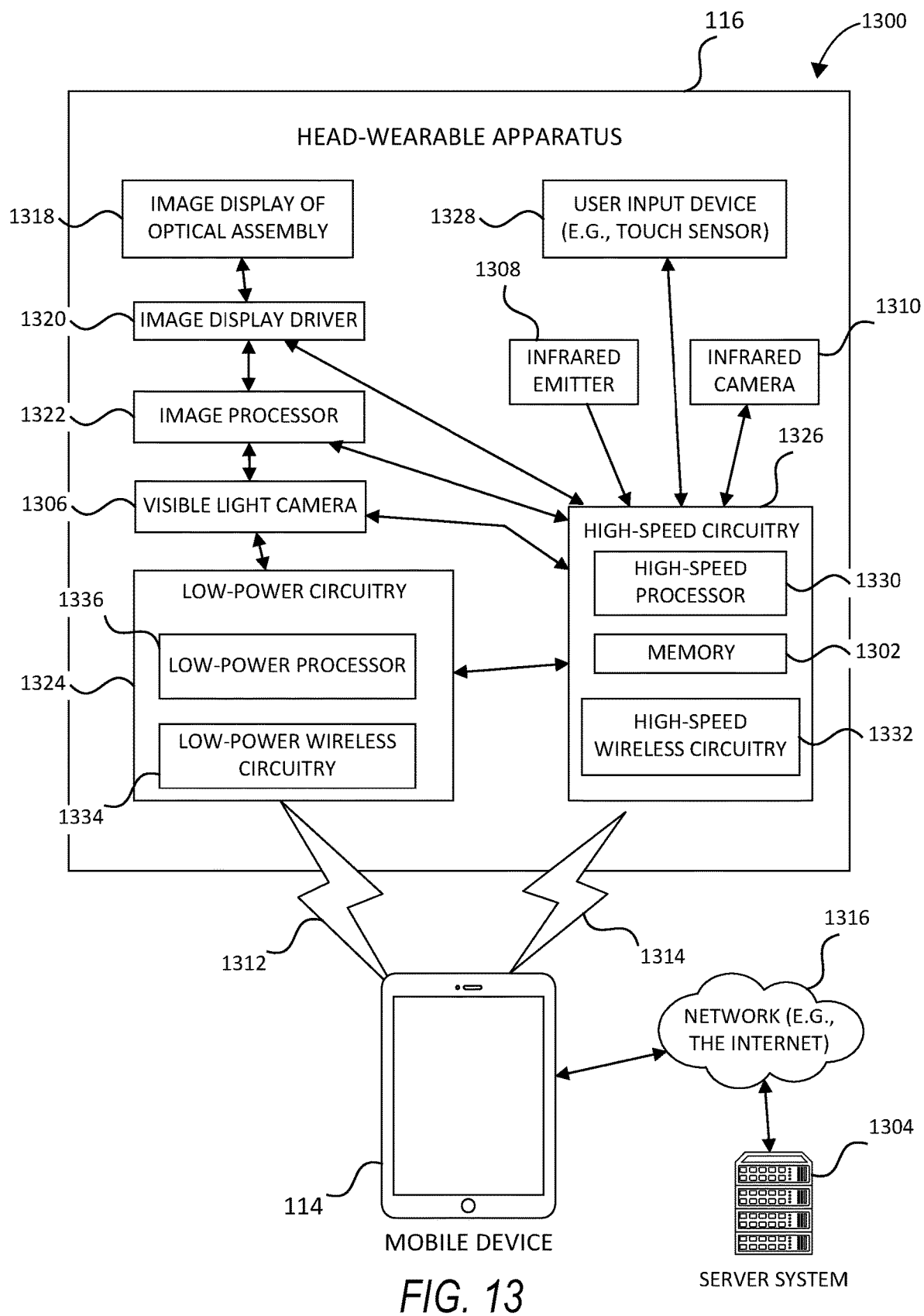
FIG. 13 illustrates a system in which a head-wearable apparatus may be implemented, in accordance with some examples.

FIG. 13 illustrates a system 1300 including a head-wearable apparatus 116 with a selector input device, according to some examples. FIG. 13 is a high-level functional block diagram of an example head-wearable apparatus 116 communicatively coupled to a mobile device 114 and various server systems 1304 (e.g., the interaction server system 110) via various networks 1316.

The head-wearable apparatus 116 includes one or more cameras, each of which may be, for example, a visible light camera 1306, an infrared emitter 1308, and an infrared camera 1310.

The mobile device 114 connects with head-wearable apparatus 116 using both a low-power wireless connection 1312 and a high-speed wireless connection 1314. The mobile device 114 is also connected to the server system 1304 and the network 1316.

The head-wearable apparatus 116 further includes two image displays of optical assembly 1318. The two image displays of optical assembly 1318 include one associated with the left lateral side and one associated with the right lateral side of the head-wearable apparatus 116. The head-wearable apparatus 116 also includes an image display driver 1320, an image processor 1322, low-power circuitry 1324, and high-speed circuitry 1326. The image display of optical assembly 1318 is for presenting images and videos, including an image that can include a GUI, to a user of the head-wearable apparatus 116.

The image display driver 1320 commands and controls the image display of optical assembly 1318. The image display driver 1320 may deliver image data directly to the image display of optical assembly 1318 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as PNG, JPEG, Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1328 (e.g., touch sensor or push button), including an input surface on the head-wearable apparatus 116. The user input device 1328 (e.g., touch sensor or push button) is to receive from the user an input selection to manipulate the GUI of the presented image.

The components shown in FIG. 13 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1306 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1302, which stores instructions to perform a subset or all of the functions described herein. The memory 1302 can also include a storage device.

As shown in FIG. 13, the high-speed circuitry 1326 includes a high-speed processor 1330, a memory 1302, and high-speed wireless circuitry 1332. In some examples, the image display driver 1320 is coupled to the high-speed circuitry 1326 and operated by the high-speed processor 1330 in order to drive the left and right image displays of the image display of optical assembly 1318. The high-speed processor 1330 may be any processor capable of managing high-speed communications and operation of any general computing system needed for the head-wearable apparatus 136. The high-speed processor 1330 includes processing resources needed for managing high-speed data transfers on a high-speed wireless connection 1314 to a wireless local area network (WLAN) using the high-speed wireless circuitry 1332. In certain examples, the high-speed processor 1330 executes an operating system such as a LINUX operating system or other such operating system of the head-wearable apparatus 116, and the operating system is stored in the memory 1302 for execution. In addition to any other responsibilities, the high-speed processor 1330 executing a software architecture for the head-wearable apparatus 116 is used to manage data transfers with high-speed wireless circuitry 1332. In certain examples, the high-speed wireless circuitry 1332 is configured to implement Institute of Electrical and Electronic Engineers (IEEE) 802.11 communication standards, also referred to herein as WiFi. In some examples, other high-speed communications standards may be implemented by the high-speed wireless circuitry 1332.

Low-power wireless circuitry 1334 and the high-speed wireless circuitry 1332 of the head-wearable apparatus 136 can include short-range transceivers (Bluetooth™) and wireless wide, local, or wide area network transceivers (e.g., cellular or WiFi). Mobile device 114, including the transceivers communicating via the low-power wireless connection 1312 and the high-speed wireless connection 1314, may be implemented using details of the architecture of the head-wearable apparatus 116, as can other elements of the network 1316.

The memory 1302 includes any storage device capable of storing various data and applications, including, among other things, camera data generated by the left and right visible light cameras 1306, the infrared camera 1310, and the image processor 1322, as well as images generated for display by the image display driver 1320 on the image displays of the image display of optical assembly 1318. While the memory 1302 is shown as integrated with high-speed circuitry 1326, in some examples, the memory 1302 may be an independent standalone element of the head-wearable apparatus 116. In certain such examples, electrical routing lines may provide a connection through a chip that includes the high-speed processor 1330 from the image processor 1322 or low-power processor 1336 to the memory 1302. In some examples, the high-speed processor 1330 may manage addressing of the memory 1302 such that the low-power processor 1336 will boot the high-speed processor 1330 any time that a read or write operation involving memory 1302 is needed.

As shown in FIG. 13, the low-power processor 1336 or high-speed processor 1330 of the head-wearable apparatus 136 can be coupled to the camera (visible light camera 1306, infrared emitter 1308, or infrared camera 1310), the image display driver 1320, the user input device 1328 (e.g., touch sensor or push button), and the memory 1302.

The head-wearable apparatus 116 is connected to a host computer. For example, the head-wearable apparatus 116 is paired with the mobile device 114 via the high-speed wireless connection 1314 or connected to the server system 1304 via the network 1316. The server system 1304 may be one or more computing devices as part of a service or network computing system, for example, that includes a processor, a memory, and network communication interface to communicate over the network 1316 with the mobile device 114 and the head-wearable apparatus 116.

The mobile device 114 includes a processor and a network communication interface coupled to the processor. The network communication interface allows for communication over the network 1316, low-power wireless connection 1312, or high-speed wireless connection 1314. Mobile device 114 can further store at least portions of the instructions for generating binaural audio content in the memory of mobile device 114 to implement the functionality described herein.

Output components of the head-wearable apparatus 116 include visual components, such as a display such as a LCD, a PDP, a LED display, a projector, or a waveguide. The image displays of the optical assembly are driven by the image display driver 1320. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1304, such as the user input device 1328, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a BMI system that allows communication between the brain and an external device or machine. This may be achieved by recording brain activity data, translating this data into a format that can be understood by a computer, and then using the resulting signals to control the device or machine.

The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1312 and high-speed wireless connection 1314 from the mobile device 114 via the low-power wireless circuitry 1334 or high-speed wireless circuitry 1332.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistant (PDA), smartphone, tablet, ultrabook, netbook, laptop, multi-processor system, microprocessor-based or programmable consumer electronics, game console, STB, or any other communication device that a user may use to access a network.

"Communication network" refers, for example, to one or more portions of a network that may be an ad hoc network, an intranet, an extranet, a virtual private network (VPN), a local area network (LAN), a WLAN, a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure. "Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure.

The terms "machine-storage media," "computer-storage media," and "device-storage media" specifically exclude carrier waves, modulated data signals, and other such media, at least some of which are covered under the term "signal medium." "Non-transitory computer-readable storage medium" refers, for example, to a tangible medium that is capable of storing, encoding, or carrying the instructions for execution by a machine. "Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or interaction on the user device, including interaction with other users or computer systems. "Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device. "Client device" refers to any machine that interfaces to a communications network to obtain resources from one or more server systems or other client devices. A client device may be, but is not limited to, a mobile phone, desktop computer, laptop, PDA, smartphone, tablet, ultrabook, netbook, laptop, multi-processor system, microprocessor-based or programmable consumer electronics, game console, STB, or any other communication device that a user may use to access a network.

"Communication network" refers to one or more portions of a network that may be an ad hoc network, an intranet, an extranet, a VPN, a LAN, a WLAN, a WAN, a WWAN, a MAN, the Internet, a portion of the Internet, a portion of the PSTN, a POTS network, a cellular telephone network, a wireless network, a Wi-Fi® network, another type of network, or a combination of two or more such networks. For example, a network or a portion of a network may include a wireless or cellular network, and the coupling may be a CDMA connection, a GSM connection, or other types of cellular or wireless coupling. In this example, the coupling may implement any of a variety of types of data transfer technology, such as 1×RTT, EVDO technology, GPRS technology, EDGE technology, 3GPP including 3G, 4G networks, UMTS, HSPA, WiMAX, LTE standard, others defined by various standard-setting organizations, other long-range protocols, or other data transfer technology.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a FPGA or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
    accessing a monocular image depicting an object;
    predicting both a volumetric reconstruction tensor of the monocular image and a pose of the object by applying a first machine learning model to the monocular image;
    identifying a portion of the pose of the object that corresponds to a point in a canonical space associated with a set of position encoding information;
    obtaining a point of the volumetric reconstruction tensor corresponding to the identified portion of the pose;
    classifying the obtained point as being inside or outside of a canonical volume by applying a second machine learning model to the obtained point of the volumetric reconstruction tensor together with the set of position encoding information; and
    generating a three-dimensional (3D) mesh representing the object in the canonical space in response to classifying the obtained point as being inside or outside of the canonical volume.

2. The method of claim 1, wherein the pose of the object comprises a skeletal representation of the object.

3. The method of claim 1, further comprising:
    selecting the point in the canonical space associated with the set of position encoding information.

4. The method of claim 1, further comprising:
    selecting a second portion of the pose of the object that corresponds to a second point in the canonical space associated with a second set of position encoding information;
    obtaining a second point of the volumetric reconstruction tensor corresponding to the second portion of the pose; and
    classifying the second point as being inside or outside of the canonical volume by applying the second machine learning model to the second point of the volumetric reconstruction tensor together with the second set of position encoding information.

5. The method of claim 4, further comprising repeating selection of portions of the pose and classification of points of the volumetric reconstruction tensor corresponding to the selected portions of the pose as being inside or outside of the canonical volume for each portion of the canonical volume.

6. The method of claim 1, wherein the set of position encoding information represents different body parts of the canonical volume.

7. The method of claim 1, further comprising training the first and second machine learning models by performing training operations comprising:
    obtaining a set of training images depicting objects, each of the set of training images being associated with 3D scans of the objects depicted in the set of training images; and
    generating ground truth canonical space representations of the objects depicted in the set of training images by modifying poses of the 3D scans of the objects to correspond to a pose in the canonical space.

8. The method of claim 7, wherein the training operations comprise:
    selecting a first training image depicting a first object corresponding to a first of the ground truth canonical space representations of the first object;
    predicting both an individual volumetric reconstruction tensor of the monocular image and an individual pose of the first object by applying the first machine learning model to the first training image;
    identifying an individual portion of the individual pose of the first object that corresponds to an individual point in the canonical space associated with an individual set of position encoding information;
    obtaining an individual point of the individual volumetric reconstruction tensor corresponding to the individual portion;
    classifying the individual point as being inside or outside of an individual canonical volume by applying the second machine learning model to the individual point of the volumetric reconstruction tensor together with the individual set of position encoding information; and
    generating occupancy loss based on a deviation between a classification resulting from classifying the individual point and a corresponding portion of the first ground truth canonical space representation of the object.

9. The method of claim 8, further comprising updating one or more parameters of the first and second machine learning models based on the occupancy loss.

10. The method of claim 8, further comprising:
    generating an individual 3D mesh representing the first object in the canonical space in response to classifying the individual point as being inside or outside of the canonical volume;
    posing the individual 3D mesh based on the individual pose of the first object predicted by the first machine learning model; and
    computing a posed loss based on a deviation between the posed individual 3D mesh and the 3D scan of the first object.

11. The method of claim 1, further comprising:
    cropping a portion of the monocular image corresponding to a head of the object;
    generating, based on the cropped portion of the monocular image, facial landmarks of the head of the object;
    predicting a head-specific canonical space reconstruction by applying a head-specific canonical network to the cropped portion based on the generated facial landmarks; and combining the head-specific canonical space reconstruction with the canonical volume corresponding to the object.

12. The method of claim 11, further comprising:
selecting a facial landmark in a head-specific canonical space representation of the object;
identifying a specific portion of the object depicted in the cropped portion of the monocular image that corresponds to the selected facial landmark;
obtaining an individual point of the volumetric reconstruction tensor corresponding to the specific portion;
classifying the obtained individual point as being inside or outside of the head-specific canonical space representation of the object by applying a third machine learning model to the obtained individual point; and
generating the head-specific canonical space reconstruction in response to classifying the obtained individual point as being inside or outside of the head-specific canonical space representation.

13. The method of claim 12, further comprising:
predicting both an additional volumetric reconstruction tensor of the cropped portion of the monocular image and a head pose of the object by applying a fourth machine learning model to the cropped portion of the monocular image, wherein the individual point is obtained from the additional volumetric reconstruction tensor.

14. The method of claim 11, further comprising:
updating a pose of a head region in the canonical volume based on the facial landmarks, wherein the 3D mesh is generated using the canonical volume with the updated pose of the head region.

15. The method of claim 11, wherein the canonical volume represents a full body canonical space reconstruction of the object, further comprising:
identifying a region in which the full body canonical space reconstruction of the object overlaps with the head-specific canonical space reconstruction; and
smoothly deforming the region based on differences between the full body canonical space reconstruction of the object and the head-specific canonical space reconstruction.

16. The method of claim 15, further comprising generating the 3D mesh based on the full body canonical space reconstruction, the head-specific canonical space reconstruction, and the smoothly deformed region.

17. The method of claim 1, further comprising generating an extended reality (XR) object based on the 3D mesh.

18. The method of claim 17, further comprising animating the XR object in a view of a real-world environment captured in real time by a camera of a user system.

19. A system comprising:
at least one processor; and
at least one memory component having instructions stored thereon that, when executed by the at least one processor, cause the at least one processor to perform operations comprising:
accessing a monocular image depicting an object;
predicting both a volumetric reconstruction tensor of the monocular image and a pose of the object by applying a first machine learning model to the monocular image;
identifying a portion of the pose of the object that corresponds to a point in a canonical space associated with a set of position encoding information;
obtaining a point of the volumetric reconstruction tensor corresponding to the identified portion of the pose;
classifying the obtained point as being inside or outside of a canonical volume by applying a second machine learning model to the obtained point of the volumetric reconstruction tensor together with the set of position encoding information; and
generating a three-dimensional (3D) mesh representing the object in the canonical space in response to classifying the obtained point as being inside or outside of the canonical volume.

20. A non-transitory computer-readable storage medium having stored thereon instructions that, when executed by at least one processor, cause the at least one processor to perform operations comprising:
accessing a monocular image depicting an object;
predicting both a volumetric reconstruction tensor of the monocular image and a pose of the object by applying a first machine learning model to the monocular image;
identifying a portion of the pose of the object that corresponds to a point in a canonical space associated with a set of position encoding information;
obtaining a point of the volumetric reconstruction tensor corresponding to the identified portion of the pose;
classifying the obtained point as being inside or outside of a canonical volume by applying a second machine learning model to the obtained point of the volumetric reconstruction tensor together with the set of position encoding information; and
generating a three-dimensional (3D) mesh representing the object in the canonical space in response to classifying the obtained point as being inside or outside of the canonical volume.

* * * * *